United States Patent [19]
Asada et al.

[11] Patent Number: 6,007,256
[45] Date of Patent: Dec. 28, 1999

[54] OPTICAL CONNECTOR THAT REDUCES THE NUMBER OF COMPONENTS USED, THAT FACILITATES ASSEMBLY, AND THAT PREVENTS SPONTANEOUS DISASSEMBLY, AND STRUCTURE FOR ATTACHING A BOOT TO AN OPTICAL CONNECTOR

[75] Inventors: Kazuhiro Asada, Yokkaichi; Hideya Konda; Kazuki Sogabe, both of Osaka, all of Japan

[73] Assignees: Sumitomo Wiring Systems, Ltd., Yokkaichi, Japan; Sumitomo Electric Industries, Ltd., Osaka, Japan

[21] Appl. No.: 08/932,536

[22] Filed: Sep. 17, 1997

[30] Foreign Application Priority Data

Sep. 24, 1996 [JP] Japan .................................. 8-251352
Sep. 24, 1996 [JP] Japan .................................. 8-251353
Oct. 2, 1996 [JP] Japan .................................. 8-261794
Mar. 31, 1997 [JP] Japan .................................. 9-080092

[51] Int. Cl.⁶ ....................................................... G02B 6/38
[52] U.S. Cl. .............................. 385/59; 385/60; 385/71; 385/72
[58] Field of Search ................................. 385/59, 60, 66, 385/70, 71, 72, 76, 77, 78, 84, 86, 85, 139

[56] References Cited

U.S. PATENT DOCUMENTS

| | | | |
|---|---|---|---|
| 4,233,724 | 11/1980 | Bowen et al. | 29/428 |
| 4,291,943 | 9/1981 | Binek et al. | 385/59 X |
| 4,326,354 | 4/1982 | Hagberg | 46/26 |
| 4,611,887 | 9/1986 | Glover et al. | 385/59 X |
| 4,715,675 | 12/1987 | Kevern et al. | 385/59 X |
| 4,737,008 | 4/1988 | Ohyama et al. | 385/59 |
| 4,744,629 | 5/1988 | Bertoglio et al. | 385/59 |
| 4,759,599 | 7/1988 | Yamaguchi et al. | 385/59 |
| 5,867,621 | 2/1999 | Luther et al. | 385/59 |

FOREIGN PATENT DOCUMENTS

| | | |
|---|---|---|
| 61-126204 | 8/1986 | Japan . |
| A-62-124513 | 6/1987 | Japan . |
| 62-106204 U | 7/1987 | Japan . |
| B2-8-7306 | 1/1996 | Japan . |

*Primary Examiner*—Phan T. H. Palmer
*Attorney, Agent, or Firm*—Oliff & Berridge, PLC

[57] ABSTRACT

There are provided a connector body having an accommodating recess in which a pair of ferrules and a pair of springs, respectively fitted over a pair of optical fibers, are accommodated, as well as a connector cover. The connector cover is provided with fixing pins, and the connector body is provided with fixing holes into which the fixing pins are press fitted. A spring pressing portion is provided on the connector cover for pressing the spring with a natural length in the direction toward its distal end at two positions when the fixing pins are press fitted into the fixing holes, and for holding the spring in a compressed state when the fixing pins have been press fitted. A guide taper is formed at a tip of the spring pressing portion. A pressing-portion fitting groove for inserting and guiding the spring pressing portion is provided in the connector body.

27 Claims, 21 Drawing Sheets

PRIOR ART

OPTICAL CONNECTOR THAT REDUCES THE NUMBER OF COMPONENTS USED, THAT FACILITATES ASSEMBLY, AND THAT PREVENTS SPONTANEOUS DISASSEMBLY, AND STRUCTURE FOR ATTACHING A BOOT TO AN OPTICAL CONNECTOR

BACKGROUND OF THE INVENTION

1. Field of the Invention

The present invention relates to an optical connector which is used in interconnecting a pair of optical fibers or interconnecting an optical fiber and a photoelectric conversion element.

2. Description of the Related Art

An optical signal transmission path using optical fibers is generally laid by optically connecting the optical fibers by using optical connectors or the like at appropriate distances. As conventional optical connectors of this type, those described in, for example, Japanese Utility Model Unexamined Publication No. Sho. 61-126204 and Japanese Patent Examined Publication No. Hei. 8-7306 are known.

Namely, in the optical connector disclosed in Japanese Utility Model Unexamined Publication No. Sho. 61-126204, a housing for accommodating a pair of ferrules is split into upper and lower parts, and accommodating grooves for accommodating the ferrules and a pair of springs (compression coil springs) or the like are formed in the upper and lower parts of the split housing. In this structure, the upper and lower parts of such a housing are secured to each other by screwing down in a state in which the ferrules and the springs or the like are clamped from both upper and lower sides in the portion of the accommodating groove and are thereby prevented from coming off and are held.

On the other hand, the optical connector disclosed in Japanese Patent Examined Publication No. Hei. 8-7306 is provided with a plug body and a floating holder disposed floatably within the plug. A ferrule accommodating recess 102 and a holding-member fitting recess 103 are formed in this floating holder 101, as shown in FIG. 36.

Then, ferrules 105 and springs 106 which are fitted over distal end portions of optical fibers 104 are inserted into the ferrule accommodating recess 102 and the holding-member fitting recess 103 of the floating holder 101, and a ferrule pressing member 107 is inserted into the holding-member fitting recess 103. As a result of the insertion of this ferrule pressing member 107, retaining portions 107a of the ferrule pressing member 107 are engaged in retained portions 101a of the floating holder 101, and are thereby prevented from coming off and held.

At this time, the ferrules 105 are urged in the inserting direction, i.e., in the direction toward their distal ends, by the springs 106 which are in the compressed state.

In this structure, the floating holder 101 in the assembled state is accommodated in the aforementioned plug body of the type split into the upper and lower parts, and the upper and lower parts of the plug body are screwed down and are secured to each other.

However, in accordance with the above-described structure in which the housing or the plug body having the structure split into upper and lower parts is fixed by screwing down, there has been a drawback in that since the number of assembling steps increases, the assembling operation is time-consuming and troublesome. In addition, a screw and a nut are required, so that there is another problem in that the number of parts used increases.

Further, in accordance with the system disclosed in Japanese Patent Examined Publication No. Hei. 8-7306 in which the ferrule pressing member 107 is inserted into the holding-member fitting recess 103 in the direction in which the springs 106 are compressed, and the retaining portions 107a are engaged in the retained portions 110a, since the insertion is effected while compressing the springs 106, there has been a possibility that the components become disassembled due to the spring force during the assembly, making the assembly difficult. In addition, after the assembly, the spring force of the springs 106 set in the compressed state constantly acts on the ferrule pressing member 107 in the coming-off direction. Hence, there has been a possibility that if the optical connector is used over a long period of time, the engaging portions of the retaining portions 107a and the retained portions 110a become not longer able to withstand the load, resulting in spontaneous disassembly.

Also, the optical connector is provided with a protective boot, as necessary, for preventing damage to a portion of an optical fiber extending from the optical connector due to the bending or the like of such an extending portion depending on the laid condition and the like.

For example, as a structure for attaching a boot in an optical connector of this type, a structure in which the boot is attached by screwing down is known, as disclosed in U.S. Pat. No. 4,744,629. Also, a structure is known in which a retaining protrusion is provided along a peripheral edge portion of the boot, a fitting groove portion is provided in a corresponding connector housing, and the boot is attached by fitting and retaining the retaining protrusion in the fitting groove portion, as disclosed in Japanese Utility Model Unexamined Publication No. Sho. 61-126204.

However, in accordance with the above-described structure for attaching the boot by screwing down, attachment is troublesome, and there is a possibility of the boot from coming off due to the loosening of the screw. Further, in accordance with the attaching structure in which the boot-side retaining protrusion is fitted and retained in the connector housing-side fitting groove, a single thin-walled retaining protrusion is merely fitted in the fitting groove portion, so that there has been a drawback in that this structure is weak against a tensile force.

SUMMARY OF THE INVENTION

Accordingly, in view of the above-described problems, an object of the present Invention is to provide an optical connector which reduces the number of components used and can be assembled simply and speedily.

As the technical means for attaining the above object, there is provided an optical connector including: a connector body having an accommodating recess accommodating a ferrule fitted over an end portion of an optical fiber and urging means for urging the ferrule in a direction toward a distal end portion thereof, the accommodating recess having an opening which is opened upwardly, and the connector body being arranged to prevent the ferrule from coming off and hold the ferrule in a state that the distal end portion of the ferrule projects forwardly from a distal-end side wall portion of the accommodating recess; and a connector cover fitted to the connector body so as to close the opening in the accommodating recess, wherein a fixing pin for fixing the connector cover is provided projectingly on one of the connector cover and the connector body, and a fixing hole into which the fixing pin is press fitted is provided in another one of the connector cover and the connector body.

In addition, an another object of the present invention is to provide an optical connector which facilitates the assembling operation and is capable of effectively preventing spontaneous disassembly even if the optical connector is used over a long period of time.

As the technical method for attaining the above object, there is provided an optical connector according to the above structure, further including: a pressing portion provided on the connector cover, the pressing portion pressing the urging means with a natural length in the direction toward a distal end thereof at a plurality of positions during a press-insertion of the fixing pin into the fixing hole, and for holding the urging means in a compressed state after the press-insertion of the fixing pin.

In addition, an another object of the present invention is to provide a structure for attaching a boot to an optical connector which facilitates attachment and makes it possible to obtain a satisfactory coupling force.

As the technical means for attaining the above object, there is provided an optical connector including: a connector housing having a connector body provided an accommodating recess accommodating a ferrule fitted over an end portion of an optical fiber and urging means for urging the ferrule in a direction toward a distal end portion thereof, the accommodating recess having an opening which is opened upwardly, and the connector body being arranged to prevent the ferrule from coming off and hold the ferrule in a state that the distal end portion of the ferrule projects forwardly from a distal-end side wall portion of the accommodating recess; a connector cover fitted to the connector body so as to close the opening in the accommodating recess; and a boot provided around the optical fiber, a ferrule-side end portion of the boot being inserted into the connector housing so as to be prevented from coming off and retained, wherein at least one of the connector body and the connector cover has a retaining portion, and an inserting portion of the boot has a retained portion engaged with the retaining portion so as to prevent from coming off and hold.

Figure 1:
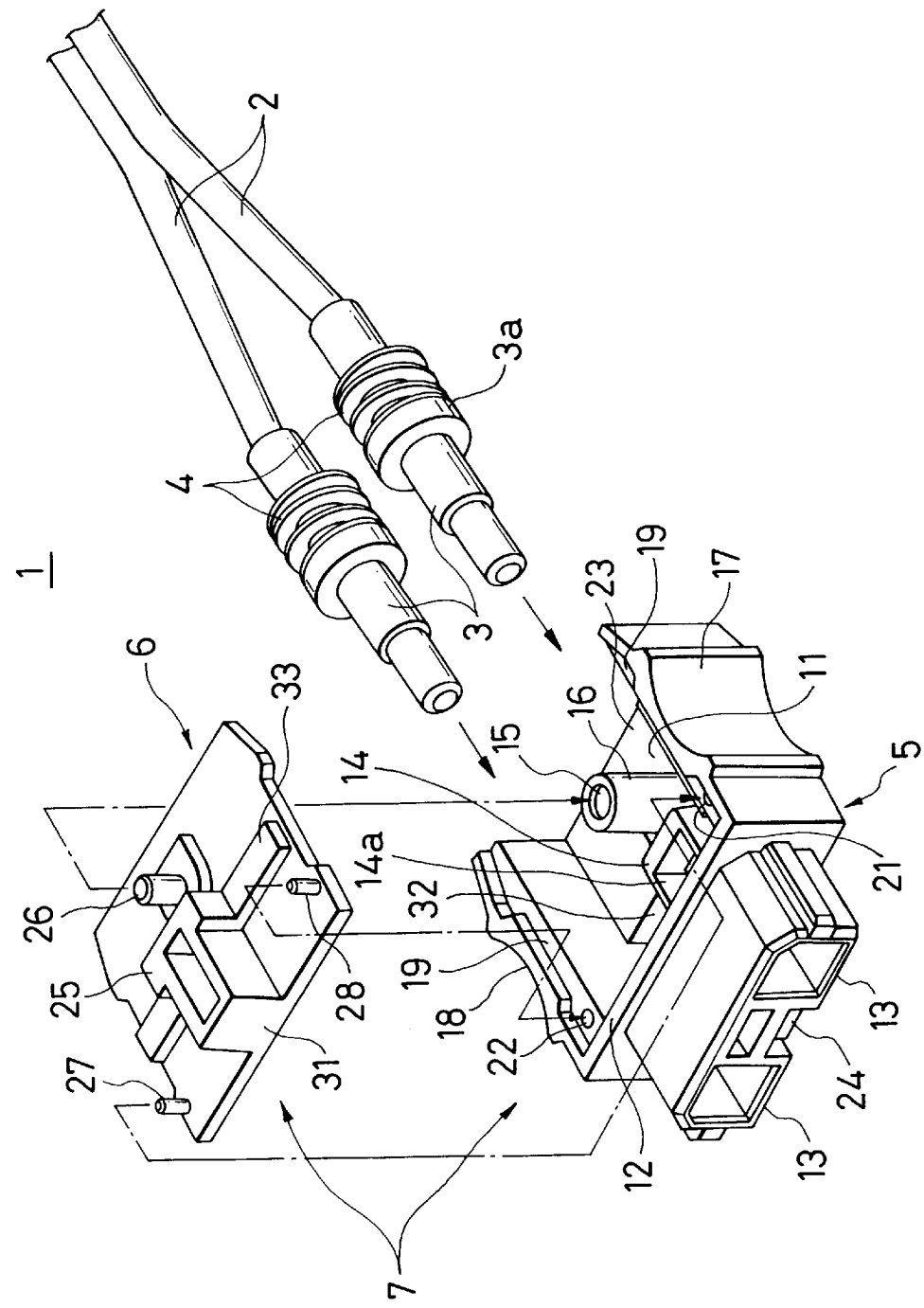
FIG. 1 is an exploded perspective view illustrating an optical connector in accordance with a first embodiment of the present invention.
Figure 2:
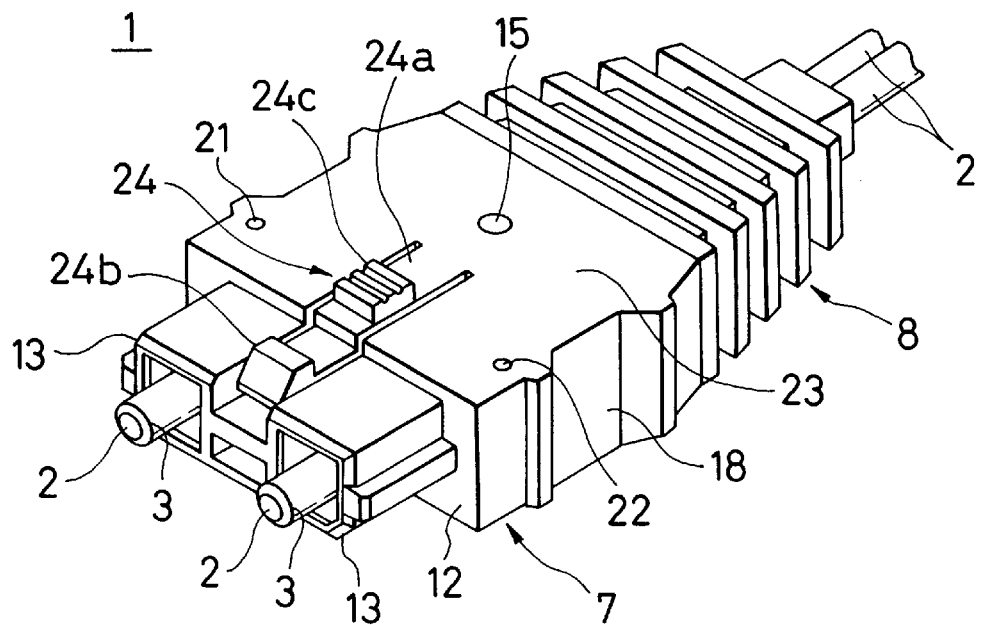
FIG. 2 is a perspective view, taken from a bottom surface side, of an optical connector shown in FIG. 1.
Figure 3:
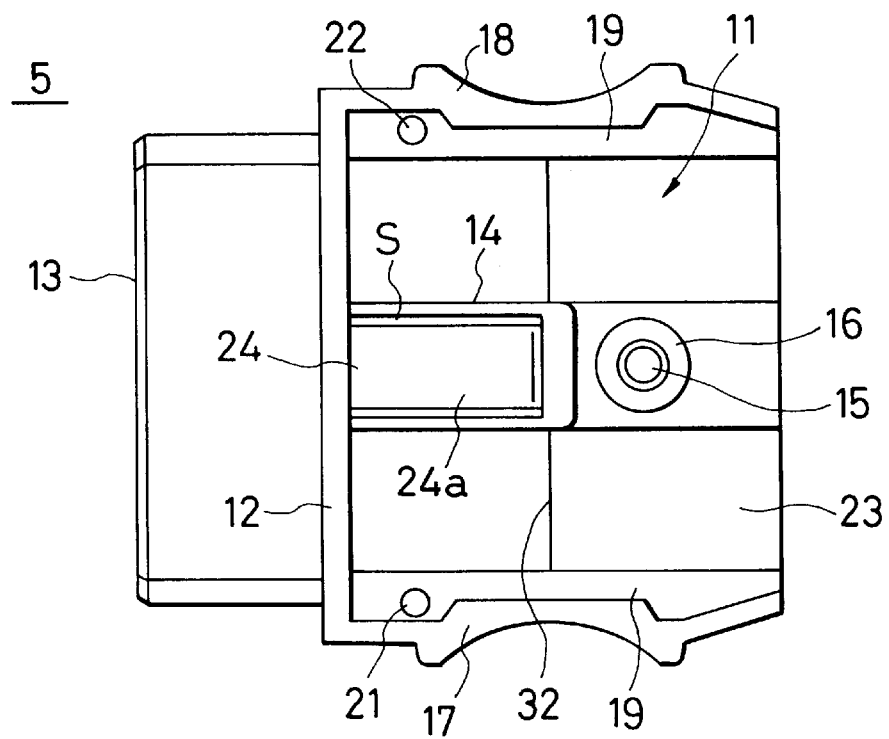
FIG. 3 is a plan view of a connector body constituting a part of the optical connector shown in FIG. 1.
Figure 4:
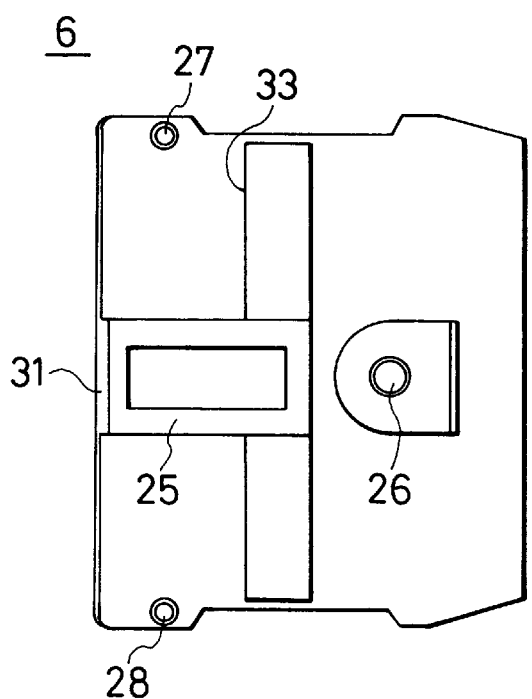
FIG. 4 is a plan view, taken from an inner surface side, of a connector cover constituting a part of the optical connector shown in FIG. 1.
Figure 5:
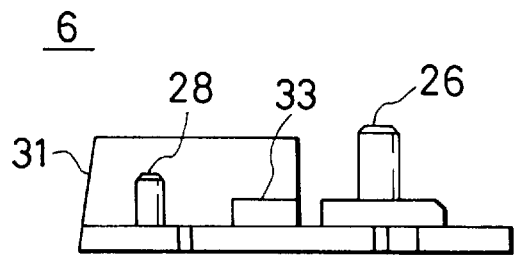
FIG. 5 is a side elevational view of the connector cover constituting a part of the optical connector shown in FIG. 1.

DETAILED DESCRIPTION OF THE PREFERRED EMBODIMENTS (First Embodiment)

Referring now to the drawings, a description will be given of a first embodiment in accordance with the present invention. As shown in FIGS. 1 to 7, an optical connector 1 is constituted by a pair of ferrules 3 respectively fitted around end portions of a pair of optical fibers 2, a pair of springs 4 respectively fitted over outer peripheries of the ferrules 3 and serving as urging unit, a connector housing 7 including a connector body 5 and a connector cover 6 and adapted to accommodate and hold the ferrules 3 and the springs 4, and a boot 8 attached to the rear end side of the connector housing 7. Incidentally, the boot 8 is omitted in FIG. 1.

The connector body 5 and the connector cover 6 are respectively formed integrally of a synthetic resin. The connector body 5 is provided with an accommodating recess 11 for accommodating the ferrules 3 and the springs 4, and two connecting cylinder portions 13 for connecting the optical connector 1 to an adaptor or the like are provided projectingly a from a distal end side of a distal end wall portion 12 for forming the accommodating recess 11. The accommodating recess 11 is open at its top and its rear end side, and an upper opening is closed by the connector cover 6. Provided inside this accommodating recess 11 are a positioning projection 14 for positioning the ferrules 3 as well as an attaching boss 16 for providing a fixing hole 15 which will be described later. Inside the accommodating recess 11 thus formed, two sets of the ferrule 3 and the spring 4 are accommodated on both sides of the positioning projection 14 and the attaching boss 16 in the state of being juxtaposed at left and right.

In addition, regulating stepped portions 19, which project inwardly at a position which is lower from an upper end face of each of left and right side wall portions 17 and 18 by the portion of the thickness of the connector cover 6, are respectively provided on inner surfaces of the left and right side wall portions 17 and 18 for forming the accommodating recess 11.

Further, the connector body 5 is provided with three fixing holes 15, 21, and 22 for fixing the connector cover 6. The fixing hole 15 among them is provided in the attaching boss 16 which is provided in such a manner as to project upward from a bottom wall portion 23 on a somewhat rearward side from the center in the accommodating recess 11. Meanwhile, the fixing holes 21 and 22 are respectively provided in distal-end side end portions of the regulating stepped portions 19 provided on the side wall portions 17 and 18 on both left- and right-hand sides, such that the fixing holes 15, 21, and 22 are located at apexes of a triangle.

In addition, the bottom wall portion 23 of the connector body 5 is provided with a lever lock 24 for maintaining a state of connection when the optical connector 1 is connected to the adaptor or the like. The lever lock 24 including a lock arm portion 24a and a retaining portion 24b, is formed in a cantilevered manner in such a manner as to extend in a direction toward the distal end from a portion of the bottom wall portion 23 located more on the distal end side than the attaching boss 16, and is provided on the inner side of the positioning projection 14 having the shape of a frame. In addition, the lock arm portion 24a projects toward the distal end side beyond the end wall portion 12, and after it is bent downward at the end wall portion 12, the lock arm portion 24a is further bent toward the distal end side. This lever lock 24 can bt deflected downward by such as pressing an operating portion 24c provided on the lock arm portion 24a.

Since such a lever lock 24 is formed, a gap S is provided in the connector body 5 around the lock arm portion 24a, but a gap-closing protrusion 25 which will be described later is provided on the connector cover 6 so as to close the gap S.

The connector cover 6 has the shape of a generally flat plate on the inner surface of which three fixing pins 26, 27, and 28 having cylindrical shapes and the protrusion 25 having the shape of a frame are formed, and the connector cover 6 has an external shape which just fits in an opening in an upper portion of the accommodating recess 11 of the connector body 5.

The three fixing pins 26, 27, and 28 are provided projectingly at positions respectively corresponding to the fixing holes 15, 21, and 22 provided at three positions on the connector body 5. The arrangement provided is such that as these fixing pins 26, 27, and 28 are press fitted into the respectively corresponding fixing holes 15, 21, and 22, the connector cover 6 is fixed to the connector body 5.

Figure 6:
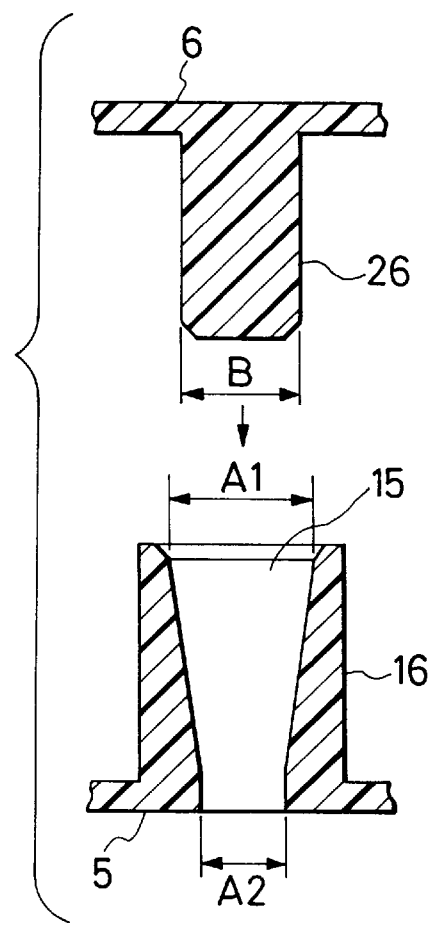
FIG. 6 is a cross-sectional view illustrating an arrangement of a fixing pin and a fixing hole which are provided in the optical connector shown in FIG. 1.

Here, the fixing holes 15, 21, and 22 respectively extend penetratingly from upper faces of the attaching boss 16 and the regulating stepped portion 19 to the bottom surface of the connector body 5. As examples of the fixing pin 26 and the fixing hole 15 are shown in FIG. 6, the fixing holes 15, 21, and 22 are formed in tapered shapes such that the inside diameter A1 at the uppor end of each of the fixing holes 15, 21, and 22 is larger than the outside diameter B of each of the corresponding fixing pins 26, 27, and 28, and the inside diameter A2 at the lower end is smaller than the outside diameter B. Consequently, the arrangement provided is such that the fixing pins 26, 27, and 28 are completely inserted in the fixing holes 15, 21, and 22 by a pressing force of 5 N or greater, and cannot be completely inserted by a pressing force of less than 5 N. Distal ends of the fixing pins 26, 27, and 28, and upper ends of the fixing holes 15, 21, and 22, which are inlet-side ends, are chamfered so as to make the insertion of the fixing pins 26, 27, and 28 smooth.

Figure 7:
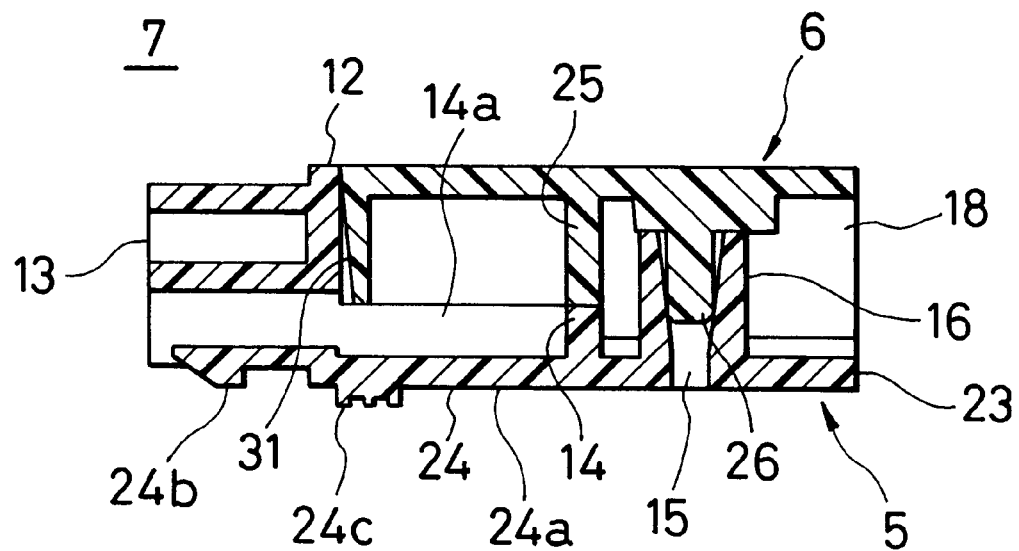
FIG. 7 is a cross-sectional view of a connector housing illustrating a state in which the connector cover is fitted to the connector body.

The protrusion 25 is provided in an area extending from a central portion of the inner surface of the connector cover 6 to a distal-end side edge thereof in such a manner as to oppose the positioning projection 14 of the connector body 5. When the connector cover 6 is fitted to the connector body 5, a lower end face of the protrusion 25 abuts against an upper end face of the positioning projection 14, and an upper-end opening 14a of the positioning projection 14 is closed, as shown in FIG. 7. As a result, dust and the like are prevented from entering the interior of the connector housing 7 through the gap S.

The distal-end side surface of the connector cover 6 is formed as a tapered surface 31 which is inwardly inclined from its outer surface-side edge toward the inner surface side, so as to allow the fitting of the connector cover 6 to be effected smoothly. Incidentally, although in this example only the distal-end side surface of the connector cover 6 is formed as the tapered surface, side surfaces of both left and right sides may also be formed as tapered surfaces.

The fitting of the ferrules 3 onto the connector body 5 is effected by inserting the ferrules 3 into the accommodating recess 11, passing the distal ends of the ferrules 3 through holes (not shown) provided in the end wall portion 12 and the connecting cylinder portions 13 and causing them to project from the distal ends of the connecting cylinder portions 13, respectively. After the fitting of the ferrules 3, the connector cover 6 is fitted to the connector body 5.

As for the fitted connector cover 6, both sides of its inner surface abut against the regulating stepped portions 19, its protrusion 25 abuts against the positioning projection 14, and its inner surface portion around the fixing pin 26 abuts against the attaching boss 16. Thus, the connector cover 6 is supported at the three portions of the connector body 5, including the two sides and the central portion, so that the connector cover 6 will not be fitted excessively into the accommodating recess 11. In addition, the springs 4 are each clamped in a state of being compressed between a collar portion 3a formed around an outer periphery of the ferrule 3 on the one hand, and spring stopper portions 32 and 33 respectively provided on the connector body 5 and the connector cover 6, on the other. The ferrules 3 are thus urged in a direction toward their distal ends by the springs 4.

The boot 8 which is formed of a synthetic resin or the like has a tubular shape, and is attached to a rear-end portion of the connector housing 7 so as to close the opening at the rear-end side of the accommodating recess 11 in a state in which the optical fibers 2 are inserted therein. The fixing of the boot 8 to the connector housing 7 is effected by providing the connector housing 7 and the boot 8 with retaining portions for fixing or by using an adhesive.

By virtue of the above-described arrangement, the connector cover 6 is fixed to the connector body 5 by press fitting the fixing pins 26, 27, and 28 into the fixing holes 15, 21, and 22. Accordingly, a screw and the like for fixing are not required, so that the number of parts used can be reduced, and the assembly of the optical connector 1 can be effected easily and speedily.

In addition, since the fixing holes 15, 21, 22 are formed in the tapered shapes as described above, the fixing pins 26, 27, and 28 are prevented from becoming broken during press fitting, aid the press fitting can be facilitated.

Further, since the inner surface of the connector cover 6 abuts against the regulating stepped portions 19, the positioning projection 14, and the attaching boss 16 of the connector body 5 to regulate the amount of insertion of the connector cover 6, even when the connector cover 6 is press fitted with a pressing force of 5 N or greater during the assembly, it is possible to prevent the optical connector 1 from becoming damaged due to excessive pressing fitting, and the connector cover 6 can always be fixed to the connector body 5 at a fixed inserted position.

Furthermore, since the arrangement provided is such that the gap S is closed by the protrusion 25 provided on the connector body 5, it is possible to prevent dust and the like from entering the interior of the connector housing 7.

Moreover, since the distal-end side surface of the connector cover 6 is formed as the tapered surface 31, when the connector cover 6 is fitted, a distal-end side peripheral portion of the connector cover 6, particularly the distal-end side edge of the protrusion 25, is prevented from becoming difficult to be press fitted due to interference with the connector body 5.

Figure 8:
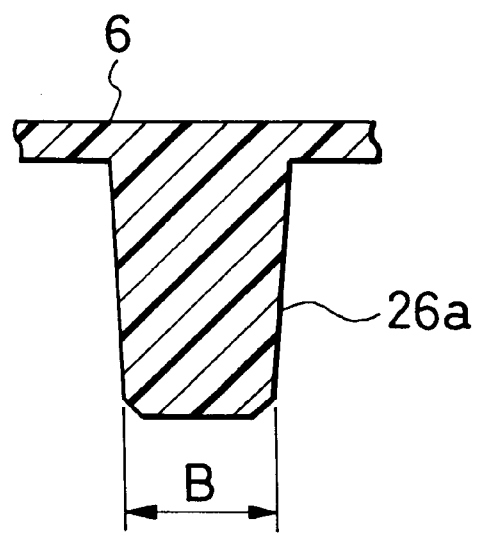
FIG. 8 is a cross-sectional view illustrating a modification of the fixing pin of the first embodiment shown in FIG. 6.
Figure 9:
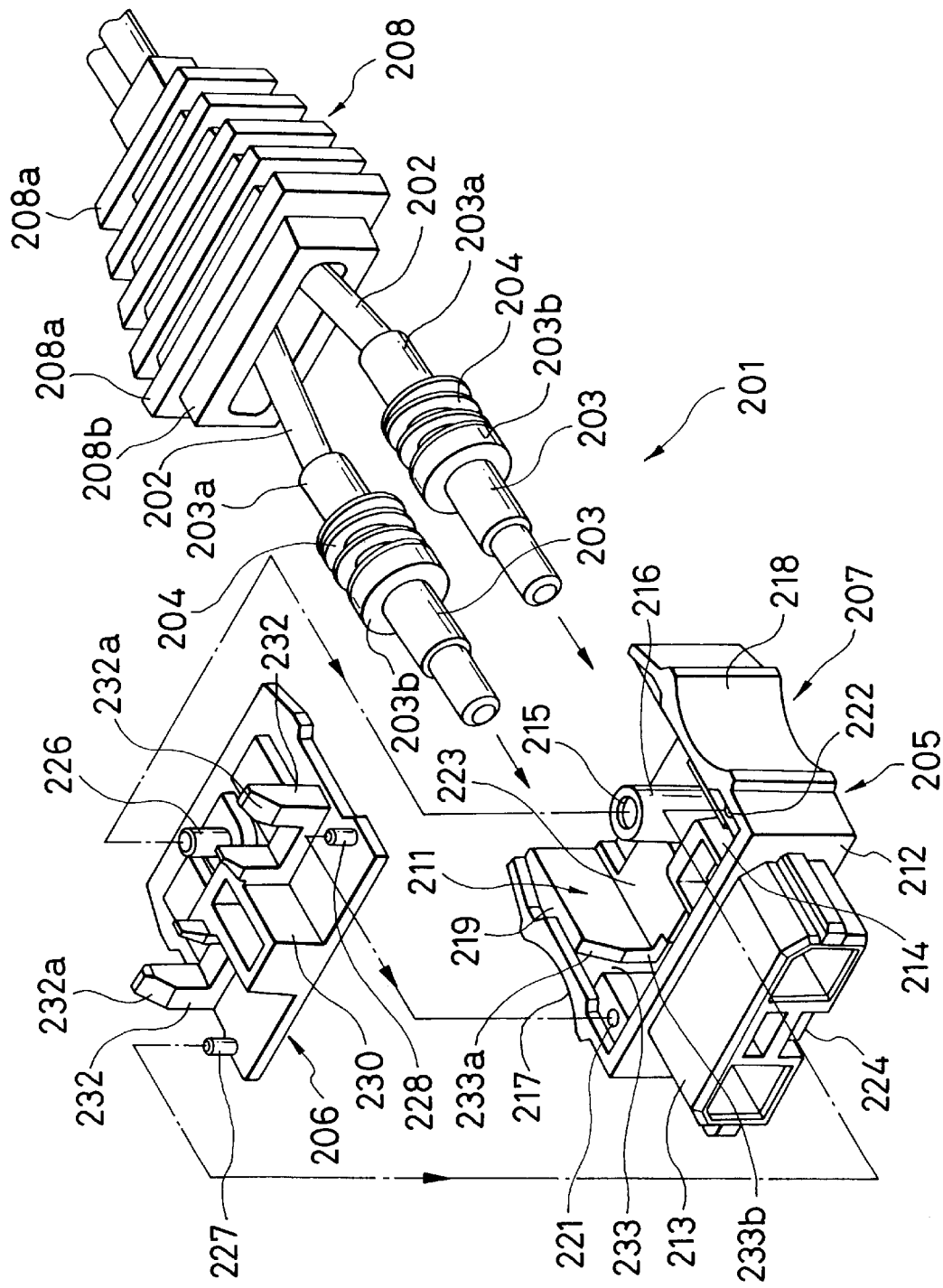
FIG. 9 is an exploded perspective view illustrating an optical connector in accordance with a second embodiment of the present invention.
Figure 10:
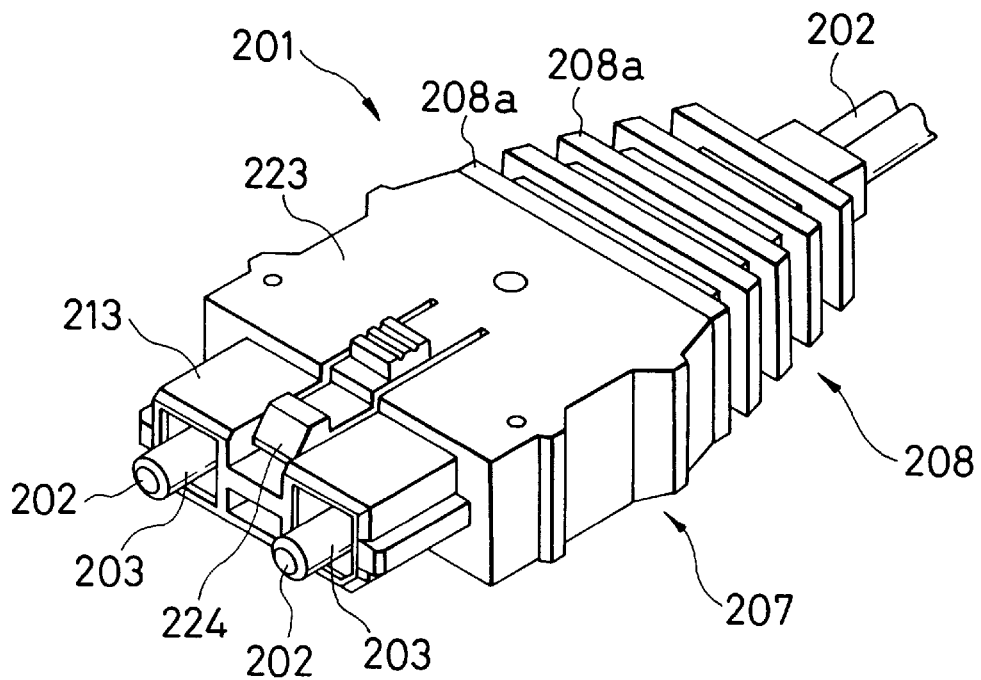
FIG. 10 is a perspective view illustrating an assembled state of the optical connector of the second embodiment.
Figure 11:
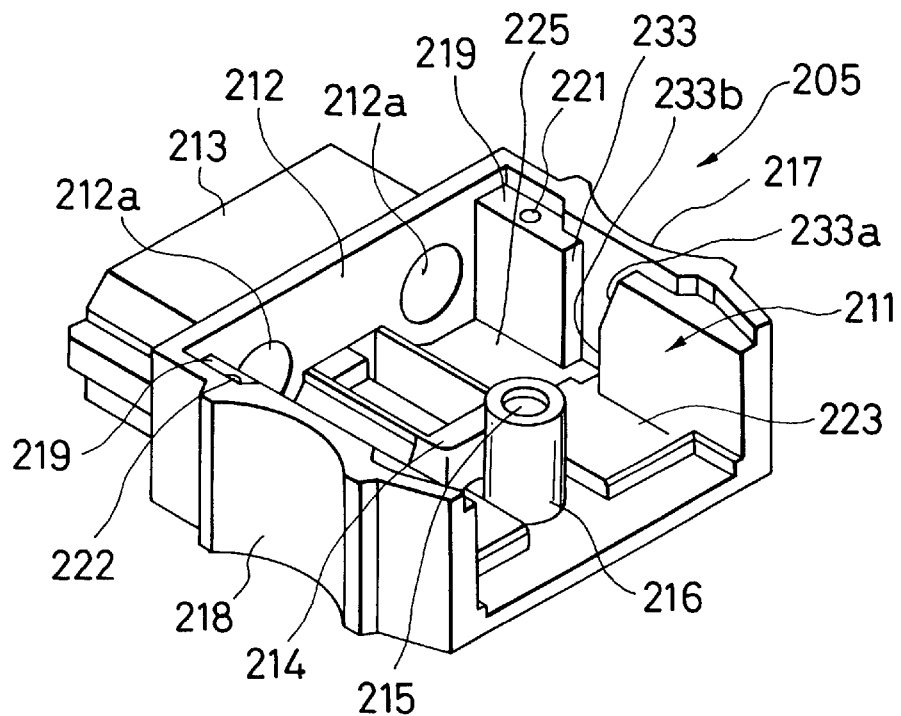
FIG. 11 is a perspective view of a connector body of the second embodiment.

FIG. 8 shows a modification of the fixing pin 26 provided on the optical connector 1 in accordance with this embodiment, and corresponding portions are denoted by the same reference numerals. This fixing pin 26a is formed in a tapered shape, and the outside diameter of its distal-end portion is set to be equal to the outside diameter B of the fixing pin 26. As both the fixing pin 26a and the fixing hole 15 are thus formed in the tapered shapes, the press fitting of the fixing pin 26a can be facilitated, and the fixing pin 26a can be made more difficult to come off. It should be noted that although only the modification of the fixing pin 26 is shown here, the other fixing pins 27 and 28 may also be formed in the tapered shapes in a similar manner.

It should be noted that although, in this embodiment, the fixing pins are provided on the connector cover 6, and the fixing holes are provided in the connector body 5, the fixing pins may be conversely provided on the connector body 5, and the fixing holes may be provided in the connector cover 6.

In addition, although, in this embodiment, the boot 8 is formed as a separate part from the connector body 5 and the connector cover 6, the boot 8 may be formed integrally therewith. Further, it is possible to adopt an arrangement in which the boot 8 is not provided. In this case, it is preferable to close the rear-end side opening of the connector body 6 excluding its portion through which the optical fibers 2 are inserted.

(Second Embodiment)

Referring now to the drawings, a description will be given of a second embodiment of the present invention. As shown in FIGS. 9 to 15, an optical connector 201 is constituted by a pair of ferrules 203 respectively fitted around end portions of a pair of optical fibers 202, a pair of helical springs 204 respectively disposed around outer peripheries of the ferrules 203 and serving as urging unit, a connector housing 207 including a connector body 205 and a connector cover 206 and adapted to accommodate and hold the ferrules 203 and the springs 204, and a boot 208 attached to the connector housing 207.

A collar portion 203b having a larger diameter is provided at a forward end of the fitting portion 203a of each of the ferrules 203, the axial length, i.e., the longitudinal length, of the fitting portion 203a is arranged to be longer than the natural length of the spring 204.

In addition, a closed-end compression coil spring whose axial ends are ground by a file, a grinder or the like so as to be flat with respect to the plane perpendicular to its axis is used as the spring 204.

The connector body 205 and the connector cover 206 are respectively formed integrally of a synthetic resin. The connector body 205 is provided with an accommodating recess 211 for accommodating the ferrules 203 and the springs 204.

A connecting cylinder portion 213 for connecting the optical connector 201 to an adaptor or the like is provided projectingly from a front face-side of a front wall portion 212 for forming the accommodating recess 211. The arrangement provided is such that the accommodating recess 211 is open at its top and its rear end side, an upper opening is closed by the connector cover 206, and the rear-end opening is closed by the boot 208.

Inside this accommodating recess 211, a positioning projection 214 extending in the longitudinal direction as well as a attaching boss 216 for providing a fixing hole 215 are provided in a central portion thereof. Inside the accommodating recess 211 thus formed, two sets of the ferrule 203 and the spring 204 are accommodated on both sides of the positioning projection 214 and the attaching boss 216 in the state of being juxtaposed at left and right. At this time, the distal end portions of the ferrules 203 are arranged to be passed through a pair of through holes 212a formed in the front wall portion 212 and the connecting cylinder portion 213 and project from the front end of the connecting cylinder portion 213.

Figure 14:
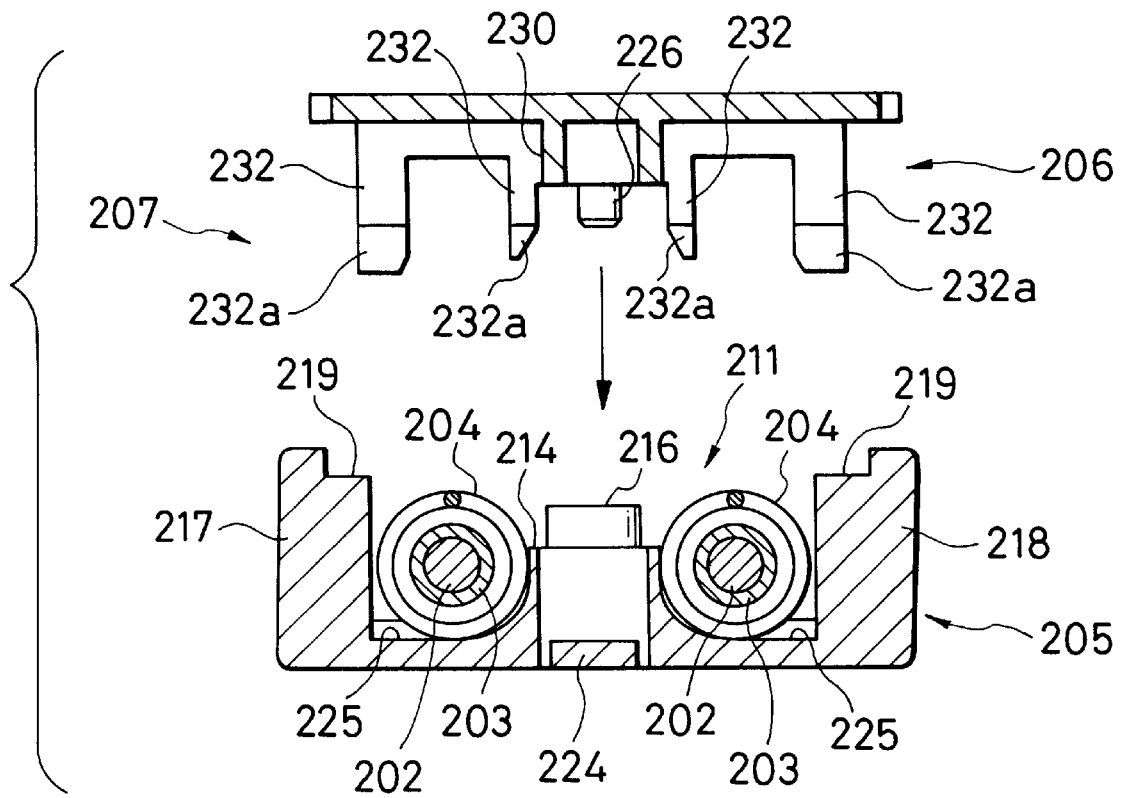

In addition, as shown in FIG. 14, the movement of the left and right springs 204 in their lateral directions is restricted by inner surfaces of left and right side wall portions 217 and 218 for forming the accommodating recess 211 and by side surfaces of the positioning projection 214 on its both sides in the central portion. Here, positioning walls for restricting the movement of the springs 204 in the lateral directions are constituted by these portions.

Further, regulating stepped portions 219, which project inwardly at a position which is lower from an upper end face of each of the side wall portions 217 and 218 by the portion of the thickness of the connector cover 206, are respectively provided on inner surfaces of left and right side wall portions 217 and 218 for forming the accommodating recess 211. The arrangement provided is such that when the connector cover 206 is fitted to the connector body 5, the inner surface of the connector cover 206 abuts against the upper faces of the regulating stepped portions 219, thereby regulating the entrance of the connector cover 206 into the interior of the accommodating recess 211.

Further, the connector body 205 is provided with three fixing holes 215, 221, and 222 for fixing the connector cover 206. The fixing hole 215 among them is provided in the attaching boss 216 which is provided in such a manner as to project upward from a bottom wall portion 223 on a somewhat rearward side from the center in the accommodating recess 211. Meanwhile, the fixing holes 221 and 222 are respectively provided in front-end side end portions of the regulating stepped portions 219 provided on the side wall portions 217 and 218 on both left- and right-hand sides.

In addition, the bottom wall portion 223 of the connector body 205 is provided with a lever lock 224 for maintaining a state of connection when the optical connector 201 is connected to the adaptor or the like. The lever lock 224 extends in the direction toward the front end in a cantilevered manner, and is arranged to be resiliently deformable.

Figure 13:
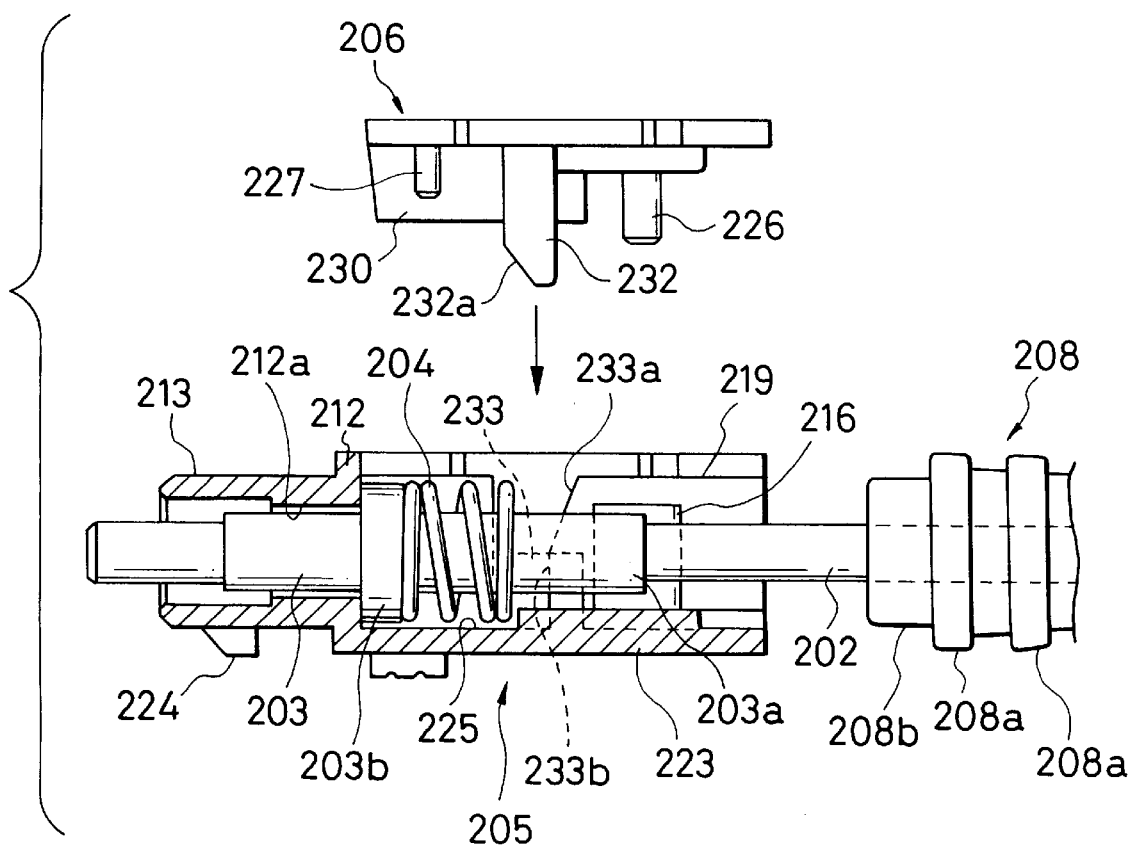
FIGS. 13 to 15 are explanatory cross-sectional views illustrating the assembling process of the second embodiment.

Further, as shown in FIG. 13, a recessed holding groove 225 is formed on an upper surface of the bottom wall portion 223 which corresponds to the position where each spring 204 is fitted. Each holding groove 225 is formed to be longitudinally longer than the natural length of the spring 204. The arrangement provided is such that each spring 204 with its natural length can be positioned and held in the holding groove 225.

Meanwhile, the connector cover 206 has an external shape which just fits in the opening in an upper portion of the accommodating recess 211 of the connector body 205, and three fixing pins 226, 227, and 228 and a positioning projection 230 are provided projectingly on its inner surface.

These three fixing pins 226, 227, and 228 are formed in substantially cylindrical shapes which are slightly tapered, and these fixing pins 226, 227, and 228 are provided projectingly at positions respectively corresponding to the fixing holes 215, 221, and 222 provided at three positions on the connector body 205. The arrangement provided is such that as these fixing pins 226, 227, and 228 are press fitted into the respectively corresponding fixing holes 215, 221, and 222, the connector cover 206 is fixed to the corrector body 205.

The positioning projection 230 is provided at a position opposing the positioning projection 214 of the connector body 205, and when the connector cover 206 is fitted to the connector body 205, the lower end face of the positioning projection 230 is arranged to abut against an upper end face of the positioning projection 214, thereby closing the gap at the lever lock 224 portion.

In addition, a pair of spring pressing portions 232 serving as pressing portions are respectively provided projectingly at transversely opposite ends of the inner surface of the connector cover 206 in its transversely intermediate portion, and both sides of the positioning projection 230. A guide taper 232a is formed at a tip of each spring pressing portion 232.

It should be noted that, as also shown in FIG. 14, the pair of spring pressing portions 232 are provided in correspondence with the springs 204 so as to press the springs 204 at a plurality of positions. Each of the pair of spring pressing portions 232 corresponding to the springs 204 is provided with an interval which is substantially the same as or slightly larger than the outside diameter of the fitting portion 203a of the ferrule 203.

Meanwhile, a pair of pressing-portion fitting grooves 233 serving as positioning guide portions for fitting and guiding outer side portions of the spring pressing portions 232 are respectively formed on inner surfaces of the side wall portions 217 and 218 on the connector body 205 side corresponding to the spring pressing portions 232 at transversely opposite ends. In addition, a rear surface-side upper end portion of each pressing-portion fitting groove 233 is formed as an insertion guide 233a which is gradually inclined rearward.

When the fixing pins 226, 227, and 228 are press fitted into the fixing holes 215, 221, and 222, the spring pressing portions 232 are arranged to be guided to predetermined positions by the insertion guides 233a so as to allow the fixing pins 226, 227, and 228 to be coincided with the fixing holes 215, 221, and 222.

In addition, as the spring pressing portions 232 are fitted into the pressing-portion fitting grooves 233, the position of each guide taper 232a is set to the position corresponding to the rear end of the spring 204 positioned and held with its natural length in the holding groove 225. Each spring 204 accommodated in the holding groove 225 in the accommodating recess 211 is gradually pressed and guided by each guide taper 232a, such that each spring 24 is finally held in the spring pressing portion 232 in the compressed state.

The boot 208 is fitted over the optical fiber 202, and is formed in a substantially triangular shape in a plan view such that its end on the connector housing 207 side is wide, and its width becomes gradually narrower toward its opposite end, so are to close the opening at the rear end of the accommodating recess 211. The boot 208 is formed of a polyvinyl-based elastomer, and is provided with a flexible structure.

Figure 23:
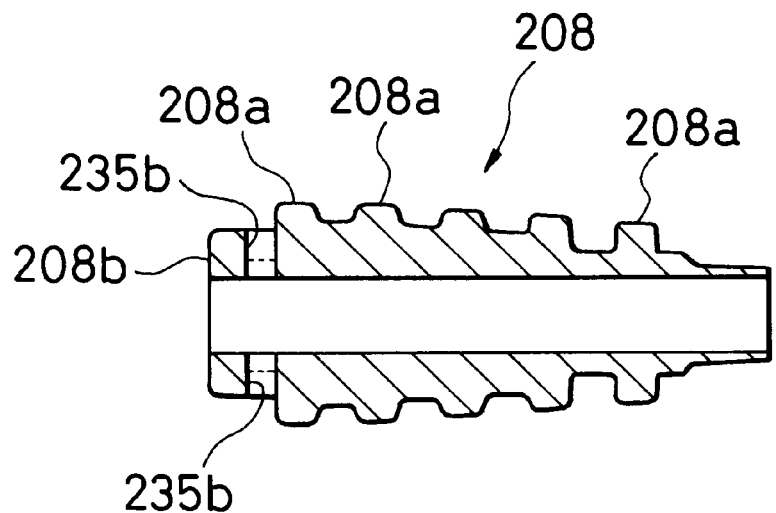
FIG. 23 is a cross-sectional view taken in the direction of arrows along line XV—XV of FIG. 21.
Figure 24:
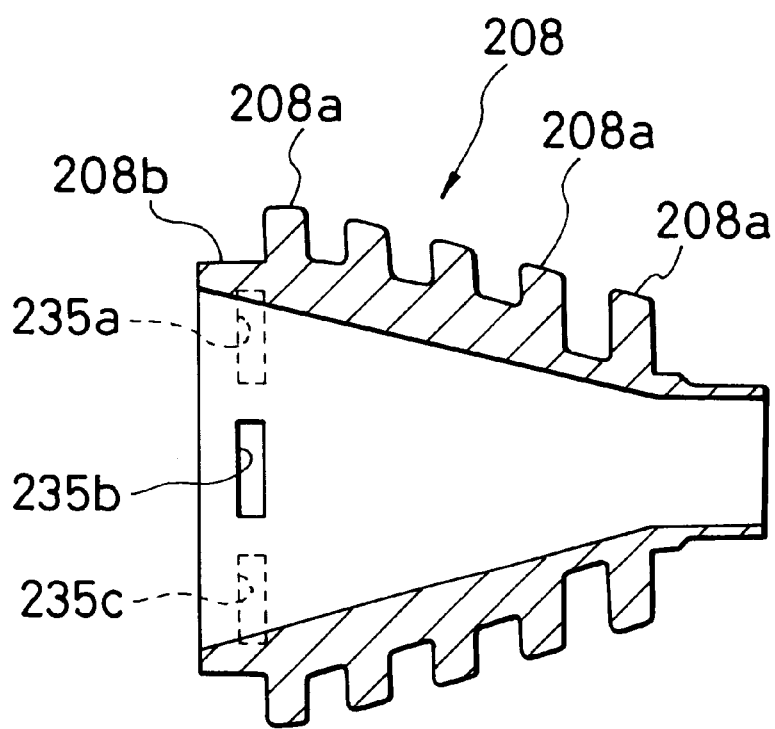
FIG. 24 is a cross-sectional view taken in the direction of arrows along line XVI—XVI of FIG. 22.

In addition, a plurality of protrusions 208a are formed on the outer peripheral surface of the boot 208 in such a manner as to be arranged at intervals in the longitudinal direction. As also shown in the cross-sectional diagrams shown in FIGS. 23 and 24, the thickness of boot 208 from its longitudinally intermediate portion to its connector housing 207 side is formed to be relatively large, whereas the thickness of its opposite narrow-side end is formed to be small, and the thickness of its narrow-side terminating end portion, in particular, is formed to be very small. Here, the arrangement provided is such that the portion of the boot 208 extending from its intermediate portion to its connector housing 207 side is difficult to bend, and its opposite end portion is liable to bend.

Furthermore, a hollow rectangular inserting and retaining portion 208b which is inserted into the connector housing 207 is provided at an end of the boot 208 on the connector housing 207 side in such a manner as to project forwardly.

This embodiment is arranged as described above, and the fitting of the ferrules 203 and the springs 204 fitted around the end portions of the optical fibers 202 is effected by inserting the ferrules 203 and the springs 204 into the accommodating recess 211, by causing distal end portions of the ferrules 203 to project respectively from a forward end portion of the connecting cylinder portion 213 via the pair of through holes 212a and the connecting cylinder portion 213 provided on the front wall portion 212, and by causing the springs 204 to be held in the holding grooves 225, as shown in FIG. 13.

When the ferrules 203 and the springs 204 are fitted, the connector cover 206 is fitted to the connector body 205 from above, as shown in FIGS. 13 and 14. As the connector cover 206 is thus fitted, each of the springs 204 which are fitted over the fitting portions 203a of the ferrules 203 is set in a state of being compressed between the collar portion 203b and the spring pressing portion 232. The ferrules 203 are thus urged in a direction toward their distal ends by this resiliency.

In addition, the fixing pins 226, 227, and 228 are respectively press fitted into the fixing holes 215, 221, and 222, thereby assembling the optical cover 206 onto the connector body 205.

Figure 15:
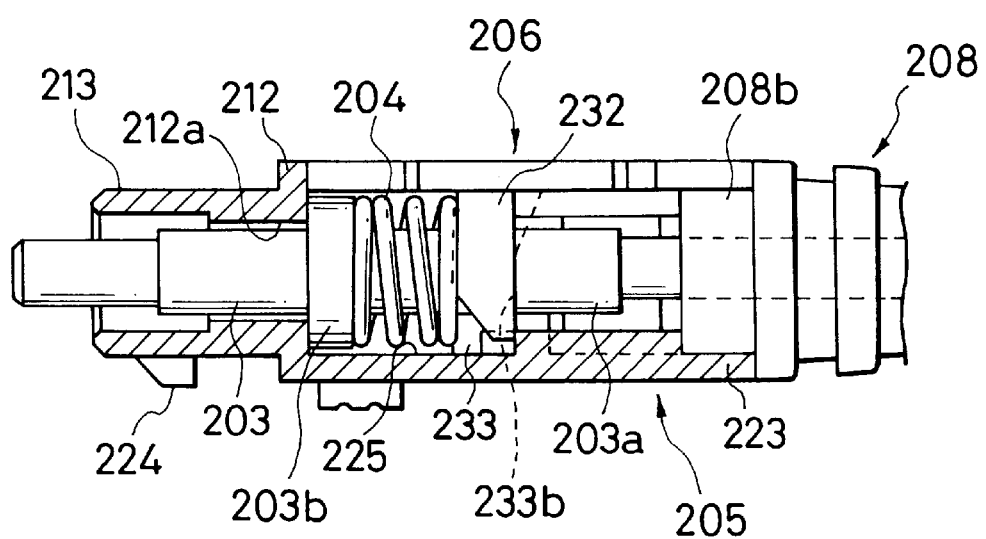

Further, as shown in FIG. 15, the inserting and retaining portion 208*b* of the boot 208 is inserted and fitted into the rear-end opening of the accommodating recess 211. Here, the optical connector 201 is assembled.

As described above, the arrangement provided is such that the connector cover 206 is fixed to the connector body 205 by press fitting the fixing pins 226, 227, and 228 into the fixing holes 215, 221, and 222. Accordingly, a screw and the like for fixing are not required, so that the number of parts used can be reduced, and the operation of assembling the optical connector 201 can be effected easily and speedily. At this time, since the amount of insertion of the connector cover 206 is regulated by the regulating stepped portions 219 of the connector body 205, it is possible to effectively prevent the situation in which the optical connector 201 becomes damaged due to excessive pressing fitting during assembly, and the connector cover 206 can always be fixed to the connector body 205 at a fixed position.

In addition, the assembling operation can be further facilitated since the fixing pins 226, 227, and 228 are guided by the insertion guides 233*a* of the pressing-portion fitting grooves 233 for fitting and guiding the spring pressing portions 232 so as to allow the fixing pins 226, 227, and 228 to be aligned with the fixing holes 215, 221, and 222. Moreover, the structure provided is such that each spring pressing portion 232 combines both a pressing operation member for the spring 204 and a guide for insertion, so that the structure can be simplified.

Further, the arrangement provided is such that when the connector cover 206 is assembled onto the connector body 205, two positions of each spring 204 that are located on both sides of the fitting portion 203*a* of each ferrule 203 are pressed by each spring pressing portion 232 provided on the connector cover 206, and each spring 204 is subsequently pressed by each spring pressing portion 232. Since each spring 204 is held at two positions on its both sides, the spring 204 can be held satisfactorily.

In addition, since the guide taper 232*a* is formed at the tip of each spring pressing portion 232, when each spring 204 is pressed by each spring pressing portion 232, the spring 204 can be subjected to a compressing operation smoothly. Moreover, since the ends of each spring 204 are formed as closed ends ground so as to be flat, the relative movement of the guide taper 232*a* and the end of the spring 204 is effected smoothly, so that the aforementioned compressing operation is effected more smoothly.

Further, the structure provided is such that a rear surface of each spring pressing portion 232 is supported by a rear surface 233*b* serving as a supporting portion constituting a part of the pressing-portion fitting groove 233. Accordingly, even if the optical connector 201 is used over a long period of time, it is possible to effectively prevent the deflectional deformation of each spring pressing portion 232, and it is possible to satisfactorily maintain the resiliently urging function of the springs for urging the ferrules 203 in a predetermined direction.

Further, since the direction in which the connector cover 206 is assembled onto the connector body 205 and the urging direction of the springs 204 each held in the state of being compressed between the collar portion 203*b* of the ferrule 203 and the spring pressing portion 232 differ from each other, it is possible to effectively prevent the spontaneous disassembly which might result from a long period of use.

In addition, the structure provided is such that when assembling, each spring 204 is positioned and held in each holding groove 225 of the connector body 205. Hence, as compared with the case where each spring 204 is positioned and held in advance in the compressed state, there is no possibility of the connector cover 206 from becoming disengaged inadvertently due to the resiliency of the springs 204 during the assembly of the connector cover 206, so that the assembling of the connector cover 206 can be effected easily.

Further, since each spring 204 is held in each holding groove 225, and the movement of each spring 204 is restricted in the lateral directions by the side wall portions 217 and 218 on both sides and by the positioning projection 214, each spring 204 can be easily accommodated in place accurately, and it is possible to effectively prevent a positional offset even when a compressing operation is effected.

In addition, since the length of the fitting portion 203*a* of each ferrule 203 is arranged to be longer than the natural length of the spring 204, even if the ferrule 203 is moved rearwardly against the resiliency of the spring 204, the movement of the ferrule 203 is effected smoothly without the rear end of the ferrule 203 becoming caught by the spring 204.

Further, since the structure provided is such that the gap is closed by the positioning projection 214 and the positioning projection 230 which are respectively provided on the connector body 205 and connector cover 206, it is possible to prevent dust and the like from entering the interior of the connector housing 207.

The boot 208 is formed of a flexible elastomer, and the portion of the boot 208 ranging from its intermediate portion to its connector housing 207 side is arranged to be thick-walled, and its opposite end side is arranged to be thin-walled, so that the bending position of the optical fibers 202 can be restricted, and the bending of the optical fibers 202 in the vicinity of the ferrules 203 can be effectively prevented, thereby making it possible to effectively protect the optical fibers 202. In addition, since the opposite terminating end portion is arranged to be much thinner, it is possible to effectively prevent a sharp bending of the optical fibers 202 in the vicinity of the output of the boot 208. As a result, it is possible to prevent an undue bending of the optical fibers 202, and it is possible to ensure the protection of the optical fibers 202.

(Third Embodiment)

Figure 16:
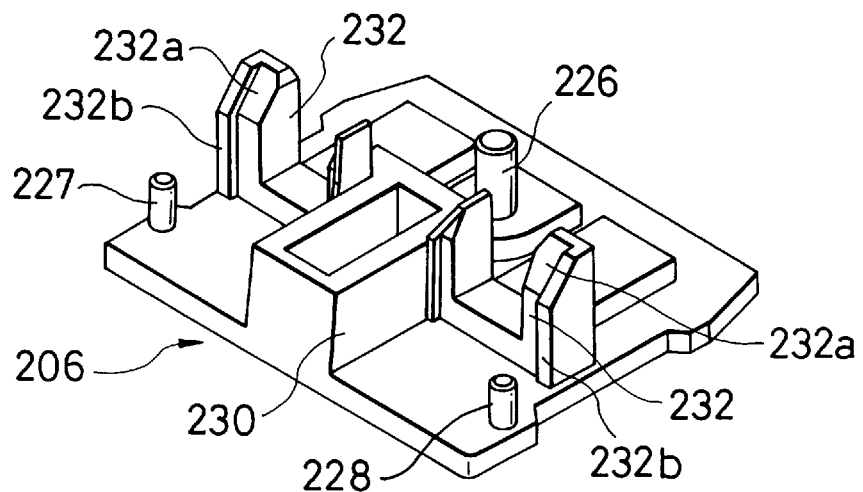
FIG. 16 is a perspective view of a connector cover in accordance with a third embodiment of the present invention.
Figure 17:
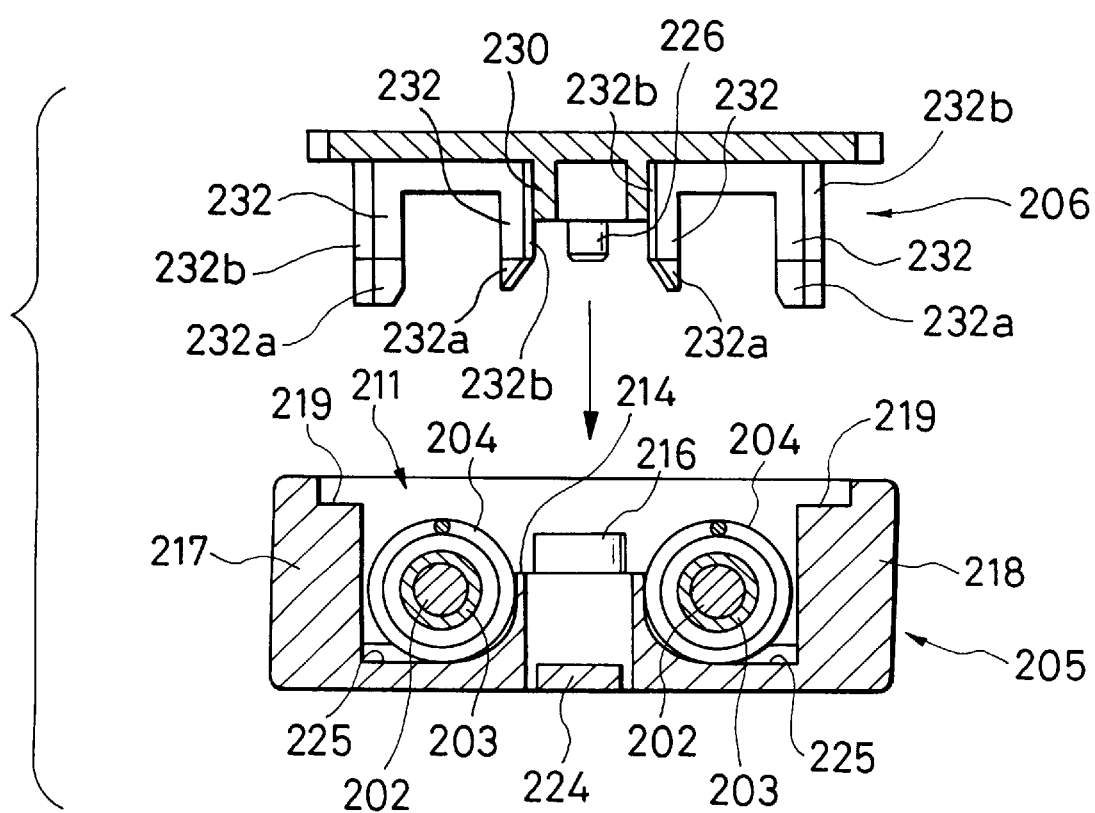
FIG. 17 is an explanatory cross-sectional view illustrating the assembling process of the third embodiment.
Figure 18:
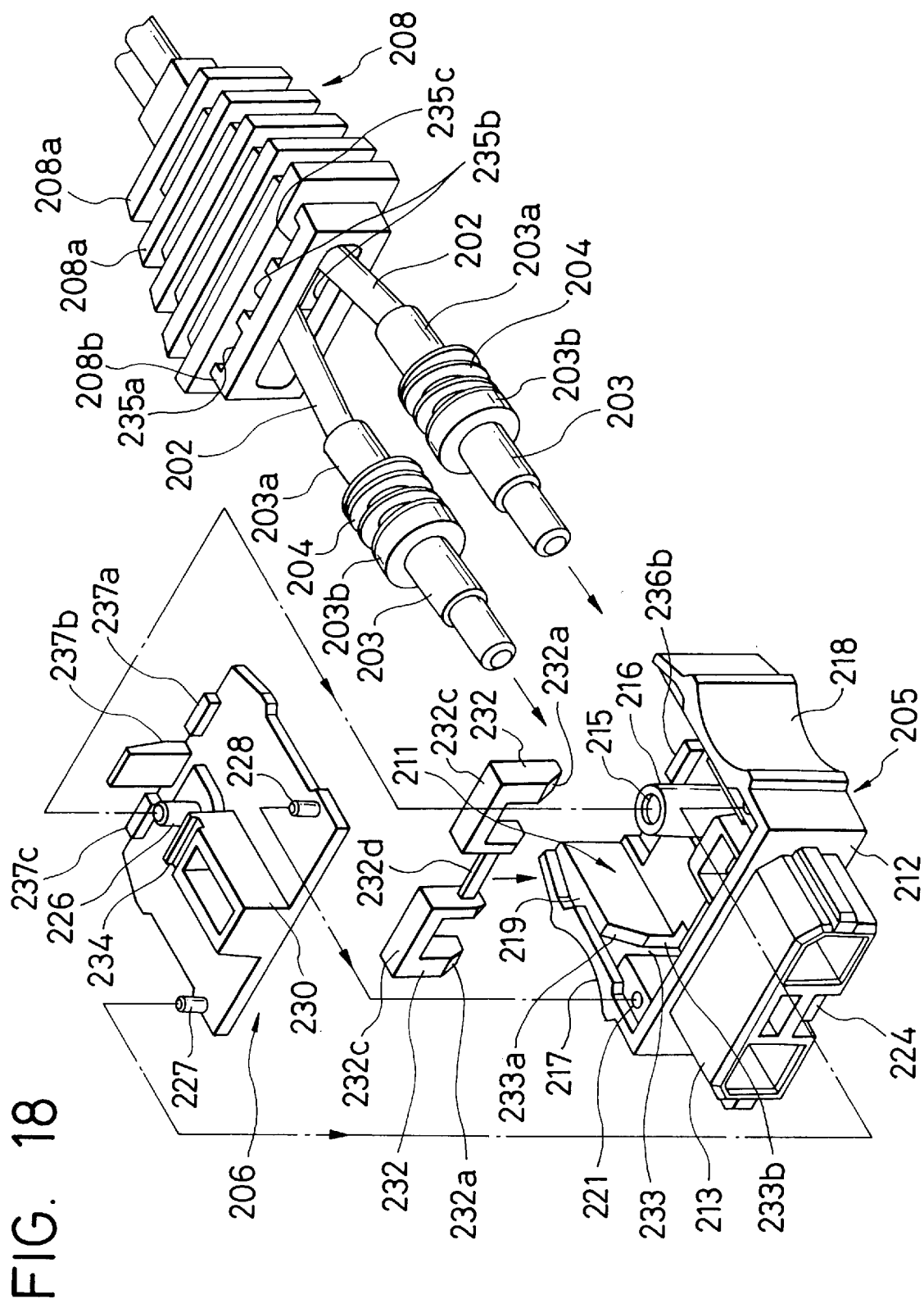
FIG. 18 is an exploded perspective view illustrating an optical connector in accordance with a fourth embodiment of the present invention.
Figure 19:
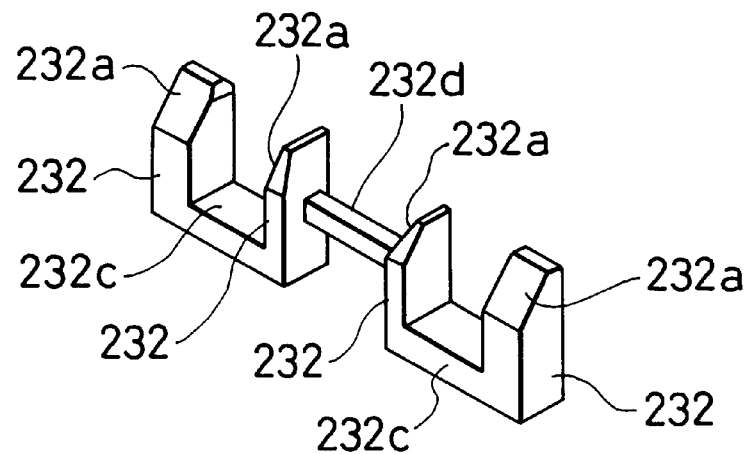
FIG. 19 is a perspective view of a pressing member of the fourth embodiment.
Figure 20:
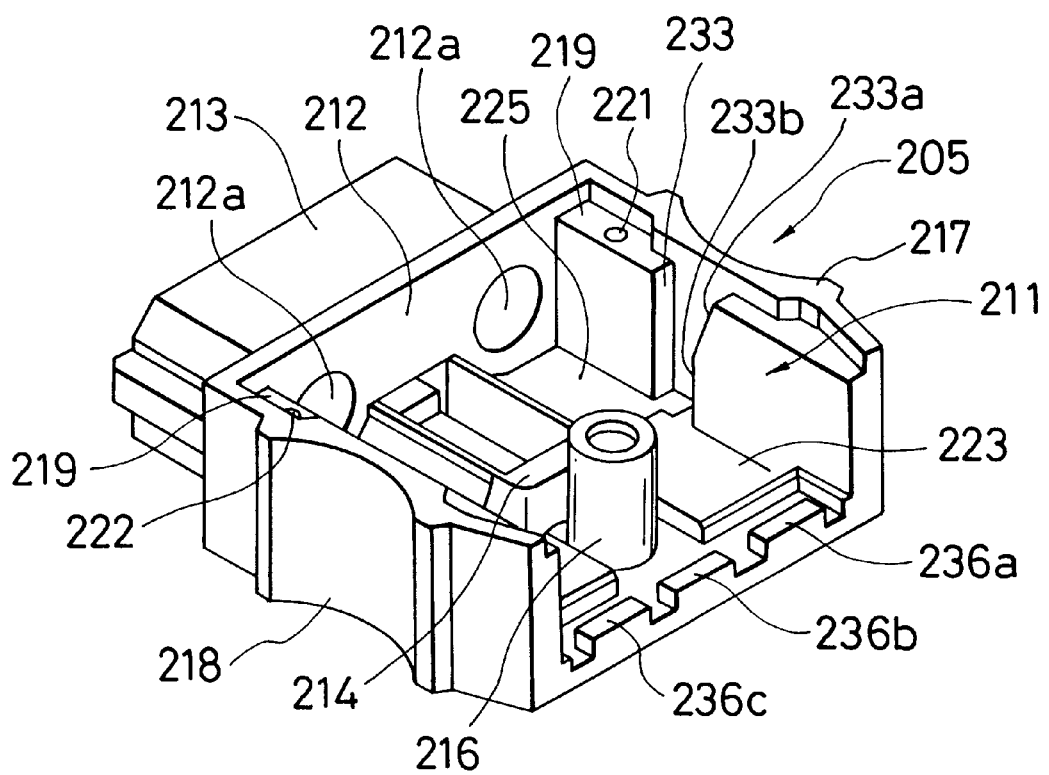
FIG. 20 is a perspective view of the connector body of the fourth embodiment.
Figure 21:
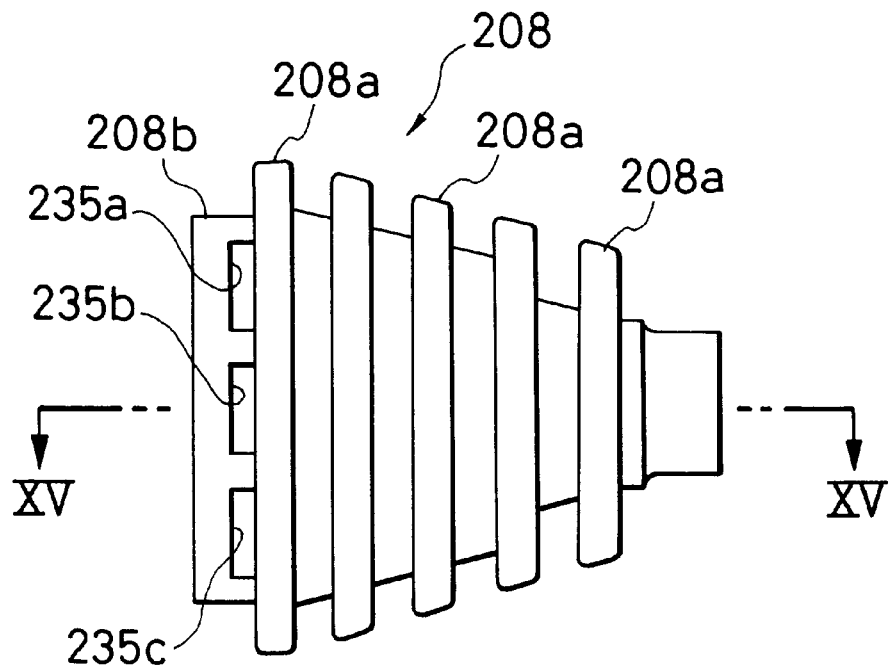
FIG. 21 is a plan view of a boot of the fourth embodiment.
Figure 22:
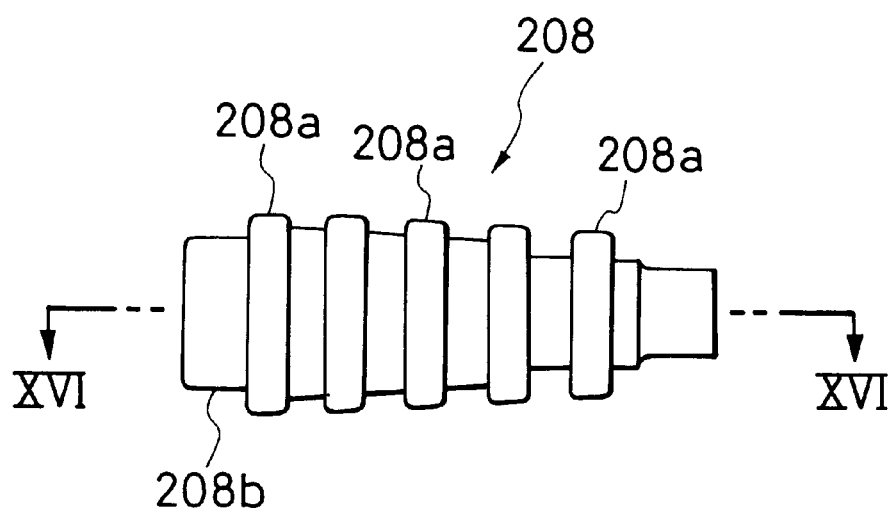
FIG. 22 is a side elevational view of the boot of the fourth embodiment.

FIGS. 16 and 17 show a third embodiment in accordance with the present invention, and those component parts that are similar to those of the above-described second embodiment are denoted by the same reference numerals, and a descripaion thereof will be omitted.

In this embodiment, a positional-offset restricting guide 232*b* for restricting the positional offset of the spring 204 when subjecting the spring 204 to the compressing operation is provided projectingly on each spring pressing portion 232, so that the axis of the ferrule 203 and the axis of the spring 204 can be arranged concentrically.

Accordingly, when the connector cover 206 is assembled onto the connector body 205, the assembly can always be effected in a state in which the position of each spring 204 is stable, and the mutual offset of the axes of the ferrule 203 and the spring 204 can be effectively prevented, thereby making it possible to effectively prevent the occurrence of an offset in the axial accuracy of the ferrules in the optical connector 201.

(Fourth Embodiment)

FIGS. 18 to 25 show a fourth embodiment in accordance with the present invention, and those component parts that are similar to those of the above-described second embodiment in accordance with the present invention are denoted by the same reference numerals, and a description thereof will be omitted.

Namely, although, in the embodiments in accordance with the present invention, the structure provided is such that the spring pressing portions 232 is provided integrally with the connector cover 206, this embodiment differs in that the spring pressing portions 232 are formed separately from the connector cover 206.

In addition, a pair of spring pressing portions 232 are provided in correspondence with each spring 204, the pair of spring pressing portions 232 are interconnected by a connecting portion 232c, and the two pairs of spring pressing portions 232 are interconnected by a coupling portion 232d. Here, the spring pressing portions 232, the connecting portions 232c, and the coupling portion 232d constitute a pressing member for pressing the springs 204.

In addition, a fixing groove 234 serving as a pressing-member fixing portion, to which the coupling portion 232d is fitted, is provided on a portion of the connector cover 206 which corresponds to the coupling portion 232d.

A plurality of recessed portions 235a, 235b, and 235c are formed on both upper-surface and lower-surface sides of the inserting and retaining portion 208b of the boot 208 in such a manner as to be arranged along a transverse direction, respectively. In addition, the central recessed portion 235b is formed as a through hole extending vertically.

Meanwhile, a plurality of retaining projections 236a, 236b, 236c, 237a, 237b, and 237c which are arranged in the transverse direction are provided projectingly from both a rear end of the bottom wall portion 223 of the connector body 205 and an inner surface-side rear end of the connector cover 206 in correspondence with the aforementioned recessed portions 235a, 235b, and 235c, these rear ends corresponding to a position in the connector housing 207 where the inserting and retaining portion 208b of the boot 208 is inserted. The central retaining projection 237b on the connector cover 206 side corresponding to the central recessed portion 235b is formed as a penetrating projection which projects longer than the retaining projections 237a and 237c on both sides thereof. The arrangement provided is such that, in a state in which the connector cover 206 is fitted to the connector body 205, the central retaining projection 237b is passed through the central recessed portion 235b of the boot 208, and abuts against a projecting end face of the central retaining projection 236b on the connector body 205 side.

It should be noted that the long projecting retaining projection 237b is formed in a tapered shape in such a manner as to become gradually thin-walled toward its projecting end so as to facilitate the insertion of the retaining projection 237b into the recessed portion 235b.

This embodiment is arranged as described above, and the fitting of the ferrules 203 and the springs 204 fitted around the end portions of the optical fibers 202 is effected in the same way as described above, i.e., by inserting the ferrules 203 and the springs 204 into the accommodating recess 211, by causing distal end portions of the ferrules 203 to project respectively from the forward end portion of the connecting cylinder portion 213 via the pair of through holes 212a and the connecting cylinder portion 213 provided on the front wall portion 212, and by causing the springs 204 to be held in the holding grooves 225.

When the ferrules 203 and the springs 204 are fitted, the spring pressing portions of the pressing member are inserted along the pressing-portion fitting grooves 233 in the connector body 205. As a result of the insertion of the spring pressing portions 232 of the pressing member, in the same way as described above, the springs 204 which are fitted loosely around the outer peripheries of the ferrules 203 are each set in the state of being compressed by the collar portion 203b formed around the outer periphery of the ferrule 203 and the spring pressing portion 232. Then, ferrules 203 are urged in the direction toward their distal ends by the resiliency of the springs 204 set in the compressed state. At this time, the pressing member is held by the pressing-member fitting grooves 233.

Subsequently, the connector cover 206 is fitted to the connector body 205. At this time, the retaining projections 236a, 236b, and 236c of the connector body 205 are fitted and retained in advance in the recessed portions 235a, 235b, and 235c on the lower side of the boot 208. As a result of the fitting of the connector cover 206, the fixing pins 226, 227, and 228 are respectively press fitted into the fixing holes 215, 221, and 222, and the retaining projections 237a, 237b, and 237c are fitted and retained in the recessed portions 235a, 235b, and 235c on the upper surface side of the boot 208. Consequently, the passage for disengagement of the pressing member from the pressing-member fitting grooves 233 is closed. Thus the optical connector 201 is assembled.

At this time, the coupling portion 232d is fitted in the fixing groove 234, so that the movement of the spring pressing portions 232 in the central portion is restricted.

Accordingly, in this embodiment as well, in the same way as the embodiments in accordance with the first aspect of the invention, there are advantages in that the assembling operation of the optical connector 201 can be effected easily and speedily, and that it is possible to effectively prevent natural disassembly resulting from a long period of use.

In addition, the system adopted is of such a type that the pressing member constituted by the spring pressing portions 232 is inserted in such a manner as to be pressed from above along the pressing-portion fitting grooves 233, so as to displace and fix the springs 4. Hence, the pressing member can be inserted without a positional offset. At the same time, since the spring pressing portions 232 with the springs 204 set in the compressed state are held in the pressing-portion fitting grooves 233 of the connector body 205, and are, so to speak, tentatively fixed, the subsequent assembling of the connector cover 206 can be facilitated.

Further, since the disengagement of the pressing member can be prevented by the connector cover 206, and the coupling portion 232d is fixed in a state of being fitted in the fixing groove 234, the pressing member can be fixed securely.

In addition, if the connector cover 206 is fitted to the connector body 205 in the state in which the retaining projections 236a, 236b, and 236c of the connector body 205 are fitted and retained in the recessed portions 235a, 235b, and 235c on the lower side of the boot 208, then the retaining projections 237a, 237b, and 237c of the connector cover 206 are fitted and retained in the recessed portions 235a, 235b, and 235c on the upper surface side of the inserting and retaining portion 208b. As a result, the upper and lower retaining projections 236a, 236b, 236c, 237a, 237b, and 237c are fitted and retained in the respective recessed portions 235a, 235b, and 235c, thereby allowing the boot 208 to be retained by the connector housing 207 and prevented from coming off the same. Consequently, the attachment of the boot 208 can be effected easily. At this time, the upper and lower retaining projections 236a, 236b, 236c, 237a, 237b, and 237c are fitted and retained in the respective recessed portions 235a, 235b, and 235c, and projecting portions each located between adjacent ones of the recessed portions 235a, 235b, and 235c function as reinforcing ribs, so that there is an advantage in that it is possible to demonstrate a satisfactory coupling force against a tensile force.

In addition, the central recessed portion 235b on the boot 208 side is formed as a through hole, and the central retaining projection 237b on the connector cover 206 side corresponding thereto is formed as a long penetrating projection which extends through the recessed portion 235b. Hence, the coupling force between the connector housing 207 and the boot 208 is made firmer, thereby making it possible to more reliably prevent the boot 208 from coming off.

It should be noted that, in this embodiment, a structure is shown in which the fixing groove 234 for fixing the pressing member is provided on the connector cover 206, it is possible to adopt a structure in which the pressing-member fixing portion is provided on the connector body 205. Further, it is possible to adopt a structure in which the pressingmember fixing portions are provided on both the connector body 205 and the connector cover 206.

Figure 25:
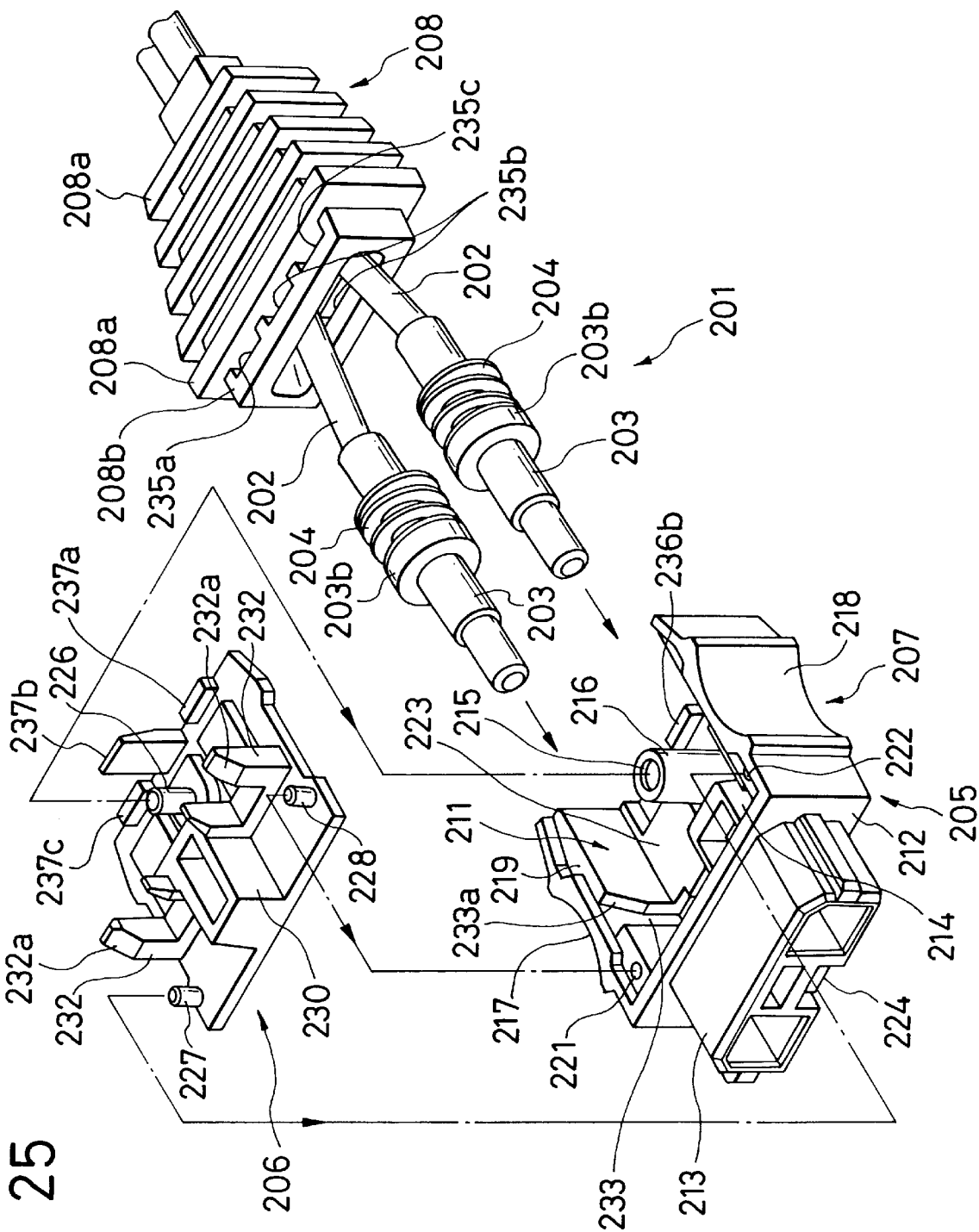
FIG. 25 is an exploded perspective view illustrating a modification combined the third and fourth embodiment of the present invention.

In addition, it should be noted that, the boot structure in this embodiment is possible to adopt to the structure such that the spring pressing portions 232 is provided integrally with the connector cover 206, as shown in FIG. 25, (Fifth Embodiment)

Figure 26:
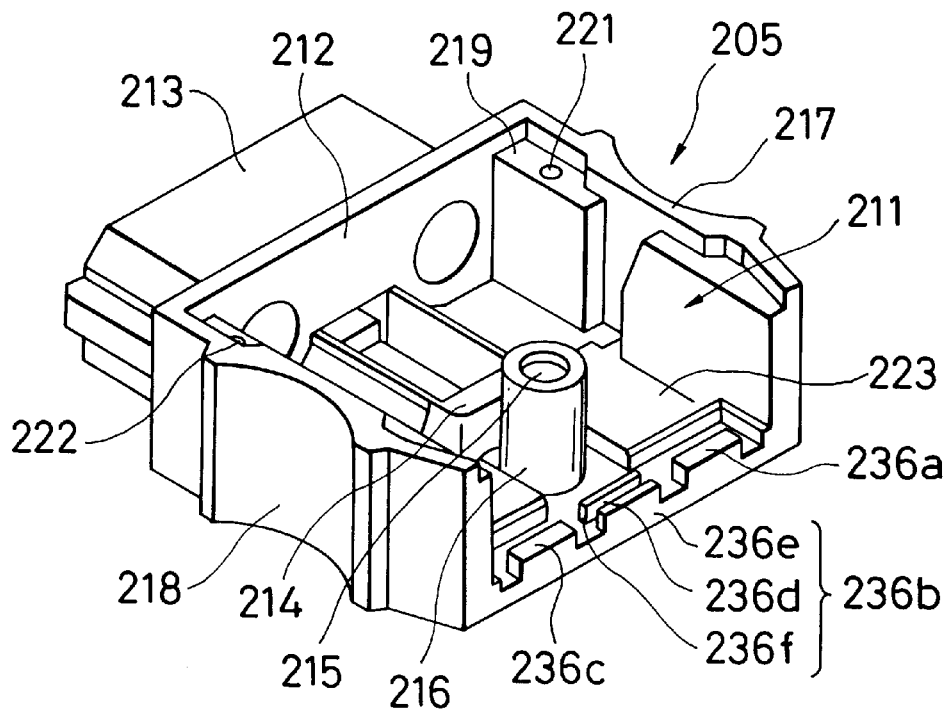
FIG. 26 is a perspective view of a connector body in accordance with a fifth embodiment.
Figure 27:
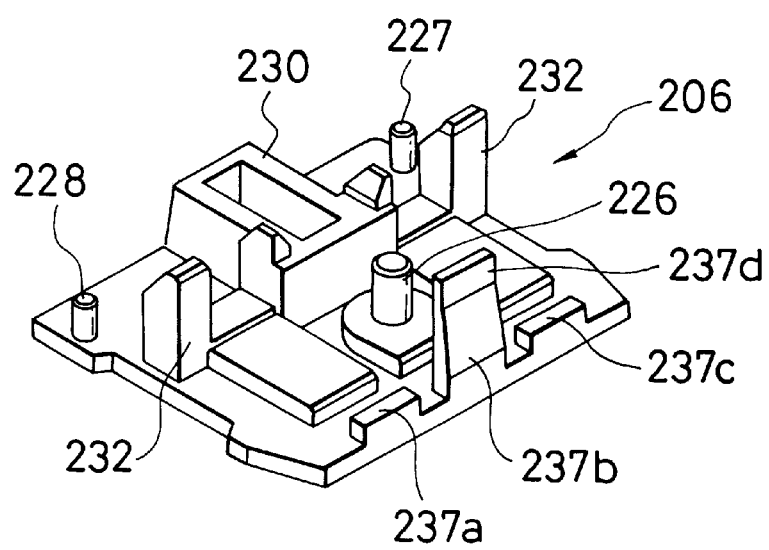
FIG. 27 is a perspective view of the connector cover of the fifth embodiment.

FIGS. 26 and 27 show a fifth embodiment in accordance with the present invention, and those component parts that are similar to those of the above-described fourth embodiment are denoted by the same reference numerals, and a description thereof will be omitted.

In this embodiment, the arrangement provided is such that the central recessed portion 236b on the connector body 205 side is provided with a splitting groove 236d in its longitudinally central portion, as well as a pair of a rear retaining projection 236e and a front retaining projection 236f which respectively extend in the transverse direction on front and rear sides of the splitting groove 236d.

Figure 28:
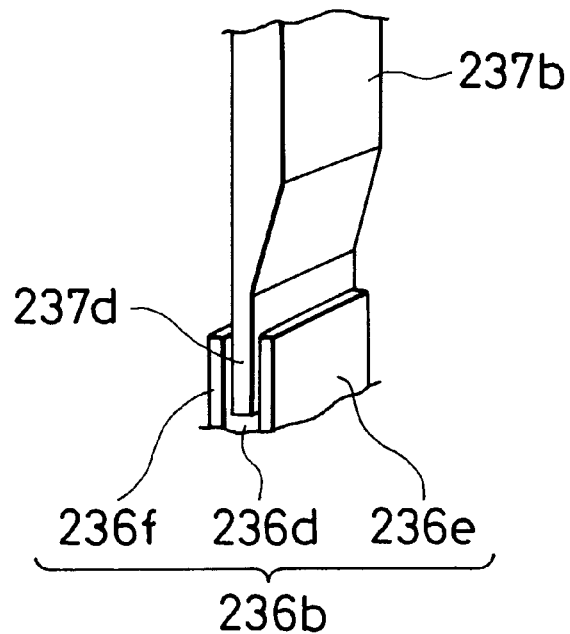
FIG. 28 is a perspective view of an essential portion in an assembled state of the fifth embodiment.

In addition, the corresponding central retaining projection 237b on the connector cover 206 side is provided with a tong portion 237d at its distal end portion. The structure provided is such that when the connector cover 206 is fitted to the connector body 205, the tongue portion 237d is fitted into the splitting groove 236d between the rear retaining projection 236e and the front retaining projection 236f, as shown in FIG. 28.

Here, the rear retaining projection 236e on the rear-end side functions as a supporting projection for restricting the deformation of the retaining projection 237b by abutting against the tongue portion 237d in the coming-off direction when a force in a direction in which the boot 208 is caused to come off the connector housing 207, i.e., a tensile force, has acted on the boot 208.

Therefore, when a tensile force has acted on the boot 8, the free end side of the retaining projection 37b which projects from the connector cover 6 in a cantilevered state is supported by the rear retaining projection 36e. Here, the retaining projection 37b is supported at its opposite ends, thereby making it possible to effectively prevent the damage of the retaining projection 37b.

(Sixth Embodiment)

Figure 29:
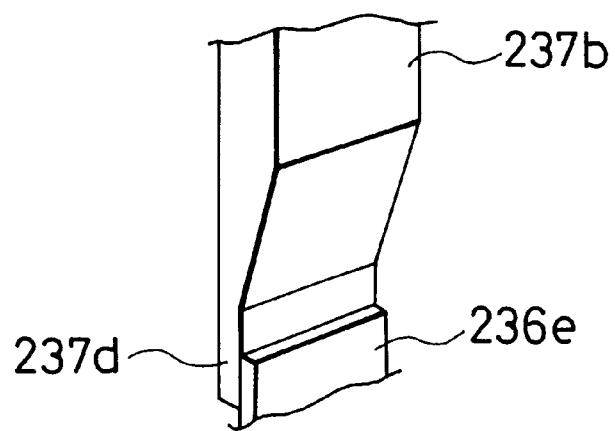
FIG. 29 is a perspective view of an assembled state of an essential portion in accordance with a sixth embodiment.

FIG. 29 shows a sixth embodiment, and those component parts that are similar to those of the above-described fourth embodiment are denoted by the same reference numerals, and a description thereof will be omitted.

Namely, although the structure provided in the above-described fifth embodiment is such that the tongue portion 237d of the retaining projection 237b is fitted in between the retaining projection 236e and the retaining projection 236f, in this six embodiment, only the rear retaining projection 236e is provided in the arrangement of this third embodiment.

In this case as well, in the same way as in the fifth embodiment, it is possible to demonstrate the function of supporting the retaining projection 237b, and a similar advantage can be obtained.

Although, in the above-described embodiments, a structure is shown in which the penetrating projection (retaining projection 237b) which is passed through the through hole (recessed portion 235b) formed in the inserting and retaining portion 208b of the boot 208 is provided on the connector cover 206 side, it is possible to adopt a structure in which the penetrating projection is provided on the connector body 205 side or a structure in which the penetrating projections are provided on both the connector body 205 and the connector cover 206.

Further, although a above-described boot structure is adopted to a structure in which the fixing pins are provided on the connector cover 206, the boot structure is possible to adopt a structure in which the connector body 205 and the connector cover 206 are fixed by screwing down or an adhesive.

(Seventh Embodiment)

Figure 30:
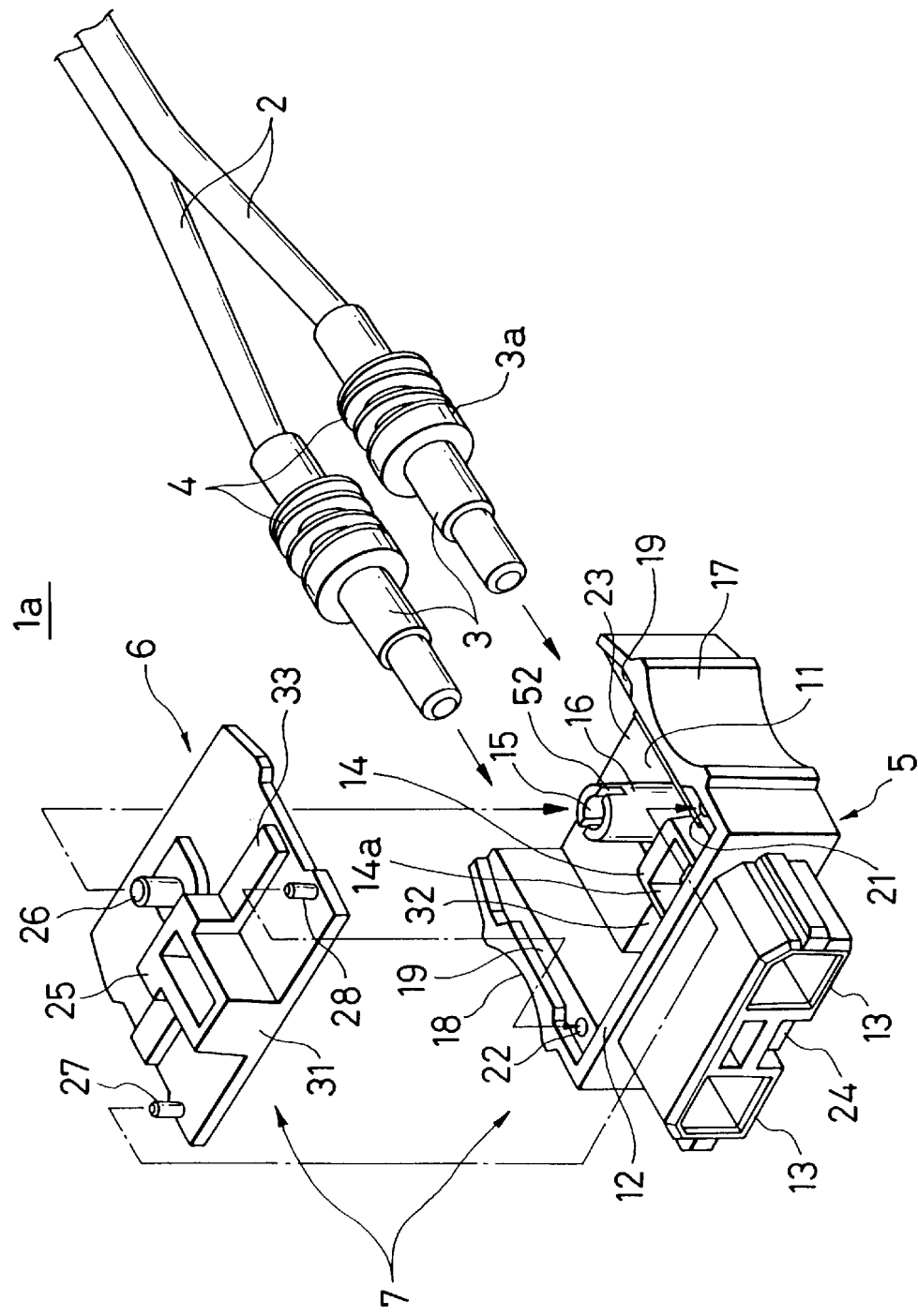
FIG. 30 is an exploded perspective view illustrating an optical connector in accordance with a seventh embodiment of the present invention.

FIGS. 30 is an exploded perspective view illustrating an optical connector 1a in accordance with a seventh embodiment of the present invention. In the optical connector 1a of the seventh embodiment, those other component parts except for the points which stepped portions 51 (see FIG. 10) are provided in inner surfaces of the fixing holes 15, 21, 22 and a split groove 52 is provided in the distal-end of the attaching boss 16 are similar to the optical connector 1 of the above-described first embodiment, and the corresponding parts are denoted by the same reference numerals, and a description thereof will be omitted.

Figure 31:
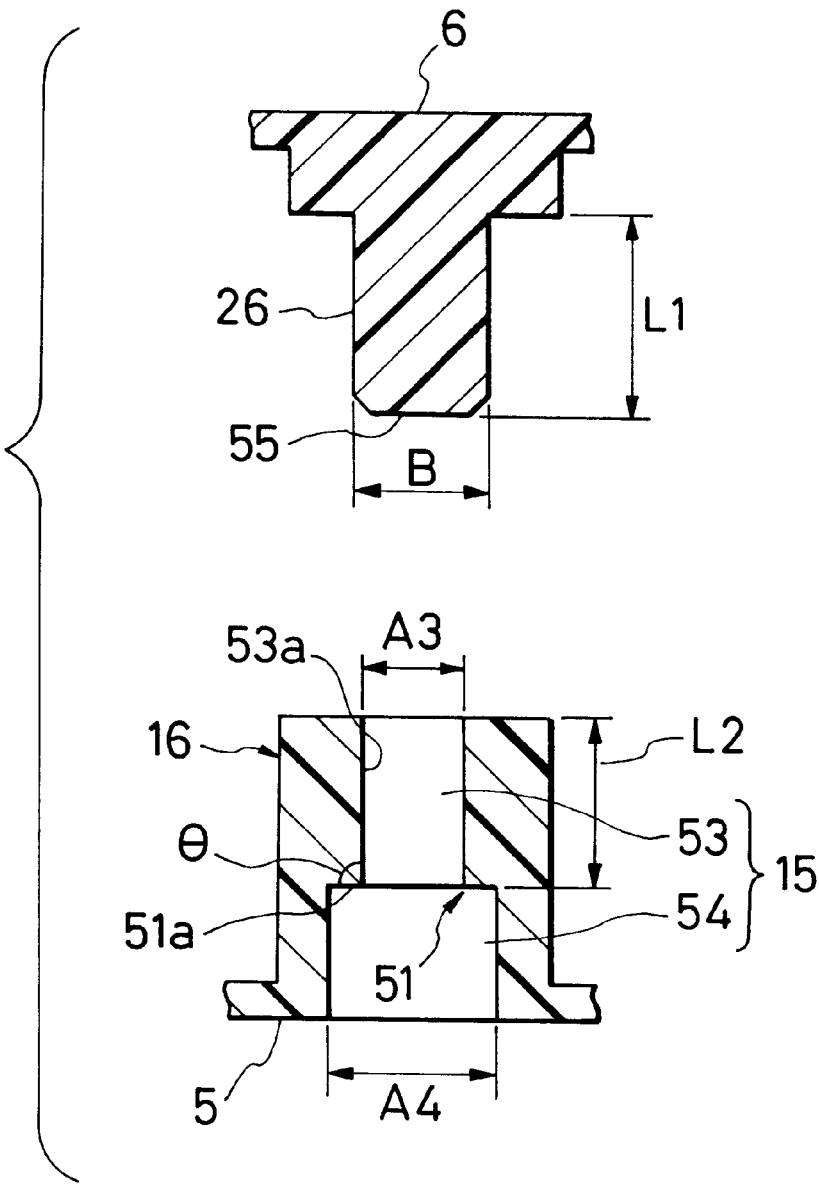
FIG. 31 is a cross-sectional view illustrating an arrangement of a fixing pin and a fixing hole which are provided in the optical connector shown in FIG. 30.
Figure 32A:
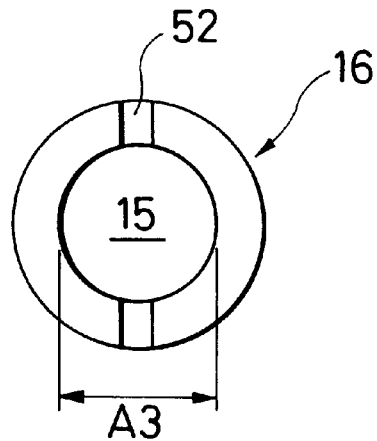
FIG. 32A is plan view of an attaching boss which is provided in the optical connector shown in FIG. 30.
Figure 32B:
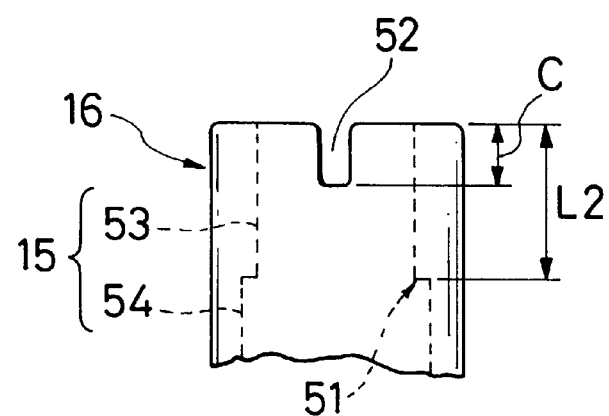
FIG. 32B is a side view of an attaching boss which is provided in the optical connector shown in FIG. 30.

In this embodiment, each of the fixing holes 15, 21, 22 is formed of a small-diameter portion 53 which extends downwardly from an opening portion of the inlet-side each of the fixing holes 15, 21, 22, and a large-diameter portion 54 which communicates downwardly with the small-diameter portion 53 via the stepped portion 51, as shown in the fixing pin 26 and the fixing hole 15 of FIG. 31. Accordingly, each of the fixing holes 15, 21, 22 has a step shape so as to enlarge an inside diameter thereof with a step at a position which is lower form the opening portion of the inlet-side by a predetermined length L2.

An inside diameter A3 each of the small-diameter portions 53 is set up to be smaller than an outside diameter B of the corresponding column-like fixing pins 26, 27, 28. An inside diameter A4 each of the large-diameter portions 54 is set up to be not less than the outside diameter B of the corresponding fixing pins 26, 27, 28. In this embodiment, the diameter A4 is set up to larger than the outside diameter B.

Figure 33:
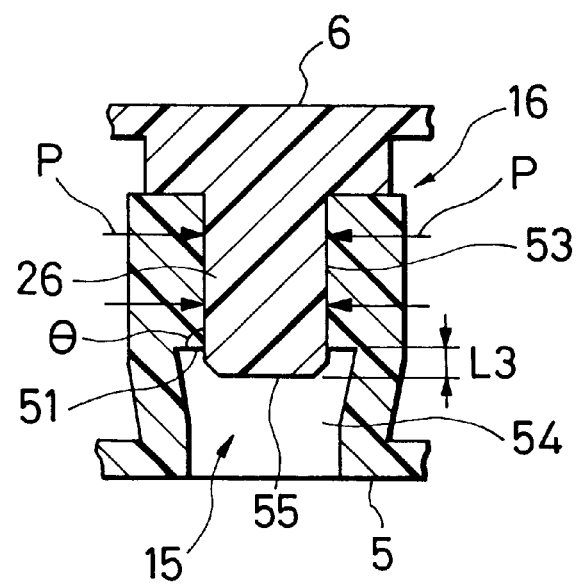
FIG. 33 is a cross-sectional view illustrating a state which the fixing pin of FIG. 31 is press inserted in the fixing hole.
Figure 34:
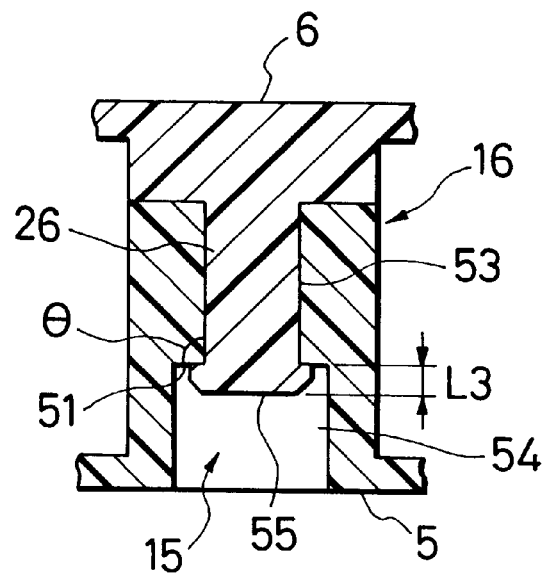
FIG. 34 is a cross-sectional view illustrating a state in which an outside diameter of a waist portion of the fixing pin in FIG. 33 is thinned by a side pressure produced from an inner wall of the fixing hole.
Figure 35:
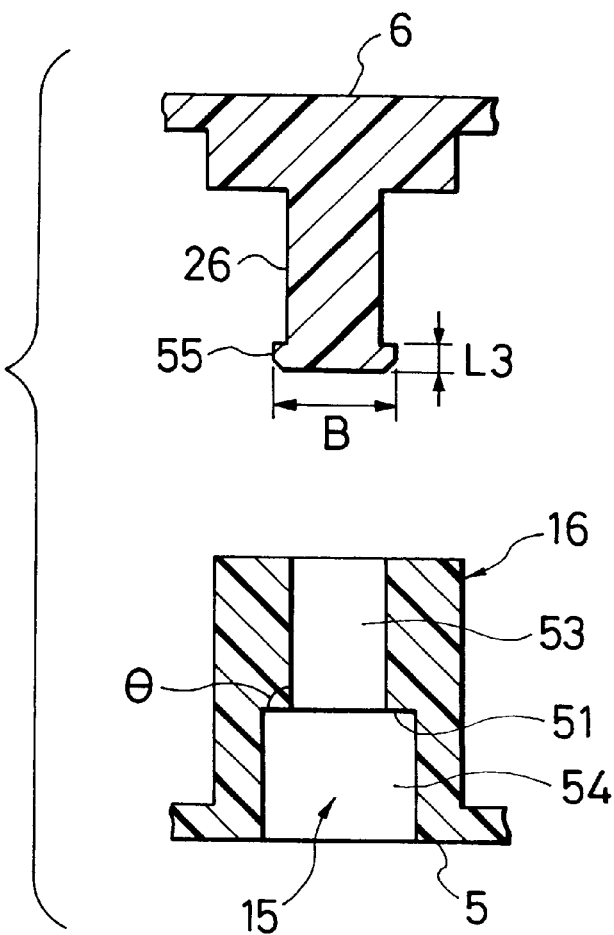
FIG. 35 is a cross-sectional view illustrating a state which the fixing pin of FIG. 34 is detached from the fixing hole.
Figure 36:
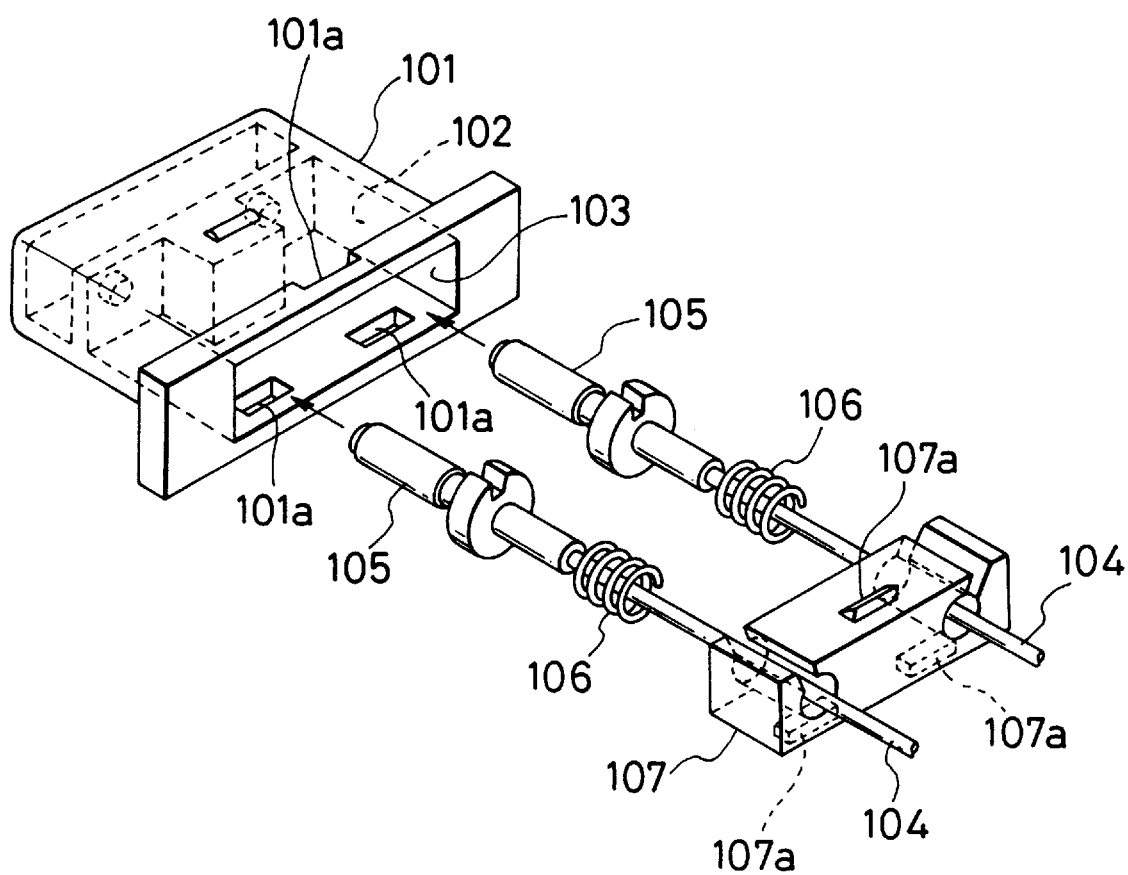
FIG. 36 is an exploded perspective view of an essential portion illustrating a conventional example.

In addition, as shown in the fixing pin 26 and the fixing hole 15 of FIG. 33, a length L1 each of the fixing pins 26, 27, 28 and the length L2 in an inserted direction each of the small-diameter portions 53 are set up so that a tip end 55 each of the fixing pins 26, 27, 28 projects into the large-diameter portion 54 over the small-diameter portion 53 by a predetermined length L3 (preferably, not less than 0.5 mm), when each of the fixing pins 26, 27, 28 is press inserted into the corresponding fixing holes 15, 21, 22. That is, the length L2 each of the small-diameter portion 53 is smaller than the length L1 each of the fixing pins 26, 27, 28 by the length L3.

An angle θ formed by a large-diameter side end surface 51a in the step portion 51 each of the fixing holes 15, 21, 22 and an inner surface 53a of the small-diameter portion 53 is set up to be not more than 100°. In this embodiment, the angle θ is set up to be 90°.

FIG. 11A is a plan view of the attaching boss 16 and FIG. 11B is a side view thereof. In the distal-end of the attaching boss 16, the spilt groove 52 is formed with a predetermined depth C so as to half-split the attaching boss 16 along the diameter direction for a simplicity of press insertion and detachment of the fixing pin 26. The depth C of the split groove 52 is set up to be substantially half of the length L2 of the small-diameter portion 53 of the fixing hole 15 for the simplicity of the detachment of the fixing pin 26.

On the other hand, as the fixing structure of the connector cover 6, in case that a press inserted fixing structure which fixes by press inserting the fixing pin into the fixing hole, the fixing pin press-inserted into the fixing hole always receives a side pressure from an inner wall of the fixing hole. Therefore, in case of a long period of use under the adverse environment such as a high temperature, it is a fear that the fixing pin disassembles from the fixing hole (spontaneous disassembly) by decreasing a outside diameter of a portion with the side pressure of the fixing pin.

Figure 12:
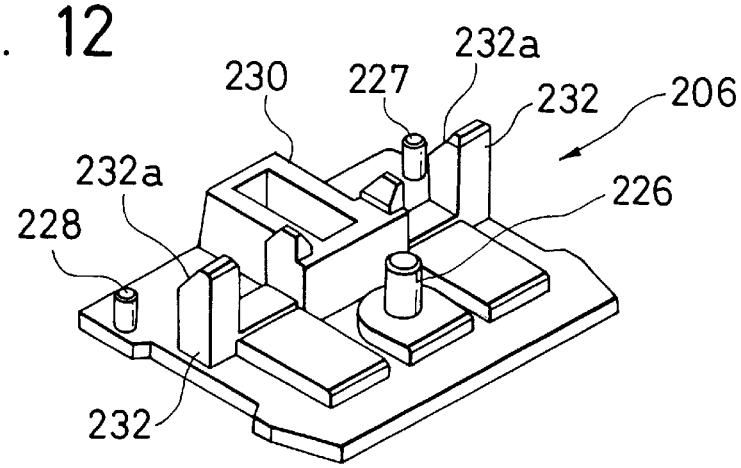
FIG. 12 is a perspective view of a connector cover of the second embodiment.

Accordingly, as shown in the fixing hole 15 and the fixing pin 26 of FIG. 12. this embodiment is designed so that the tip end 55 each of the fixing pins 26, 27, 28 projects into the large-diameter portion 54 by passing through the small-diameter portion 53 each of the fixing holes 15, 21, 22. In this configuration, although the side pressure P is always given at a position each of the fixing pins 26, 27, 28 which is placed inside of the small-diameter portion 53, the side pressure P is not given at the tip end 55.

Therefore, as shown in the fixing pin 26 of FIG. 13, even if the outside diameter B at the portion each of the fixing pins 25, 27, 28 which is placed inside of the small-diameter portion 53 is decreased by the side pressure P in accordance with a long period of use under the high temperature, the outside diameter B of the tip end 55 is not changed. Thus, since the tip end 55 functions as a stopper, the fixing pins 26, 27, 28 are prevented from coming off, thereby preventing a spontaneous disassembly. By the way, FIG. 14 shows a condition that the fixing pin 26 of FIG. 13 is detached from the fixing hole 15.

In this embodiment, in addition to the effect of the first embodiment such that a screw and the like for fixing are not required, so that the number of parts used can be reduced, and the assembly of the optical connector 1a can be effected easily and speedily, the following effect can be obtained. Since the step portion 51 is provided into each the fixing holes 15, 21, 22 and the side pressure P is always given on the portion each of the fixing pins 26, 27, 28 which is placed into the small-diameter portion 53 and the side pressure P is not given at the tip end 55, even if this optical connector 1a is used for a long time under the adverse environment such as high temperature, this optical connector 1a can prevent the fixing pins 26, 27, 28 from coming off the fixing holes 16, 21, 22 spontaneously, or by a vibration or the like, thereby holding the assembling condition of the connector cover 6 certainly.

Further, since the angle θ formed by the large-diameter side end surface 51a in the step portion 51 each of the fixing holes 15, 21, 22 and the inner surface 53a of the small-diameter portion 53 is set up to be not more than 100°, as shown in FIG. 13, even if a waist portion each of the fixing pins 26, 27, 28 is thinned by the side pressure P, the tip end 55 each of the fixing pins 26, 27, 28 are certainly retained by the step portion 51, thereby surely preventing the fixing pins 26, 27, 28 from coming off.

Moreover, since the split groove 52 is provided in the distal-end of the attaching boss 16, at the time of the press insertion and detachment of the fixing pin 26, this split groove 52 is opened in such a manner that the inside diameter of the fixing hole 15 formed of the split groove 52 is enlarged moderately, thereby press inserting and detaching the fixing pin 26 easily.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

What is claimed is:

1. An optical connector comprising:
   a connector body having an accommodating recess accommodating a ferrule fitted over an end portion of an optical fiber and urging means for urging said ferrule in a first direction toward a distal end portion thereof, said accommodating recess having an opening which is opened upwardly with respect to a bottom wall portion of said connector body, and said connector body being arranged to prevent said ferrule from coming off and hold said ferrule in a state that said distal end portion of said ferrule projects forwardly from a distal-end side wall portion of said accommodating recess; and
   a connector cover fitted to said connector body so as to close the opening in said accommodating recess,
   wherein a fixing pin for fixing said connector cover is provided projectingly on one of said connector cover and said connector body, and a fixing hole into which said fixing pin is press inserted is provided in another one of said connector cover and said connector body.

2. An optical connector according to claim 1, wherein said connector cover has a pressing portion pressing said urging means with a natural length in the first direction at a plurality of positions during a press-insertion of said fixing pin into said fixing hole, and holding said urging means in a compressed state after the press-insertion of said fixing pin.

3. An optical connector according to claim 2, wherein the natural length of said urging means is shorter than the length of a fitting portion of said ferrule over which said urging means is fitted.

4. An optical connector according to claim 3, wherein said pressing portion is provided with an interval having a width which is identical to an outside diameter of the fitting portion of said ferrule, and said pressing portion is provided with a positional-offset restricting guide for restricting a positional offset of said urging means whose opposite sides are pressed-by said pressing portions during the press-insertion of said fixed pin.

5. An optical connector according to claim 2, wherein a guide taper for pressing and guiding said urging means is formed at a tip of said pressing portion, and a positioning guide-portion for positioning said guide taper is provided on said connector body so as to allow said guide taper to correspond to an end portion of said urging means during the press-insertion of said fixing pin.

6. An optical connector according to claim 2, wherein said bottom wall portion of said connector body has a holding groove portion positioning and holding said urging means with the natural length.

7. An optical connector according to claim 2, wherein said connector body has a positioning wall restricting the movement of said urging means in a second direction being perpendicular to an axial direction thereof.

8. An optical connector according to claim 2, wherein said connector body has a supporting portion supporting said pressing portion by abutting against a surface of said pressing portion which is opposite to a surface thereof for pressing said urging means.

9. An optical connector according to claim 1, wherein said fixing hole has a small-diameter portion communicating with an inlet-side opening portion thereof, an inside diameter of said small-diameter portion being smaller than an outside diameter of said fixing pin and a large-diameter portion communicating with said small-diameter portion via a stepped portion, an inside diameter of said large-diameter portion being not less than the outside diameter of said fixing pin, and further
wherein said fixing pin is set up to be longer than said small-diameter portion in such a manner that a tip end of said-fixing pin press-inserted into said fixing hole projects into said large-diameter portion by a predetermined length through said small-diameter portion.

10. An optical connector according to claim 9, wherein said fixing hole are formed in a cylindrical attaching boss provided projectingly on the another one of said connector cover and said connector body, and a distal-end of said attaching boss has a split groove having a predetermined depth so as to enlarge said attaching boss in a radial direction.

11. An optical connector according to claim 10, wherein the depth of said split groove is a substantially half length of said small-diameter portion.

12. An optical connector according to claim 9, wherein said fixing pin is projected into said large-diameter portion by more than 0.5 mm.

13. An optical connector according to claim 1, further comprising:
a pressing member pressing said urging means with a natural length in the first direction at a plurality of positions during an insertion of said pressing member in said connector body, and holding said urging means in a compressed state after the insertion of said pressing member, said pressing member being guided vertically by a positioning guide portion provided on said connector body during the insertion of said pressing member.

14. An optical connector according to claim 13, wherein a pressing-member fixing portion which fixes said pressing member is provided on at least one of said connector body and said connector cover.

15. An optical connector according to claim 1, wherein said fixing hole is formed in a tapered shape, and an inside diameter in an inlet-side end of said fixing hole is larger than an outside diameter of said fixing pin and an inside diameter in a bottom-wall side end of said fixing hole is smaller than the outside diameter of said fixing pin.

16. An optical connector according to claim 1, further comprising:
a regulating stepped portion projected inwardly on a peripheral wall portion of said accommodating recess of said connector body, said regulating stepped portion regulating an amount of insertion of said connector cover fitted in the opening of said accommodating recess.

17. An optical connector according to claim 1, wherein said fixing pins are provided at three locations on one of said connector body and said connector cover, and said fixing holes are provided at three corresponding positions in another one of said connector body and said connector cover.

18. An optical connector according to claim 1, further comprising:
a locking means formed at said bottom wall portion of said connector body deflectably, and having a cantilevered shape; and
a closing protrusion provided on said connector cover, and closing a gap produced around said locking means.

19. An optical connector comprising:
a connector housing having:
a connector body provided an accommodating recess accommodating a ferrule fitted over an end portion of an optical fiber and urging means for urging said ferrule in a direction toward a distal end thereof, said accommodating recess having an opening which is opened upwardly, and said connector body being arranged to prevent said ferrule from coming off and hold said ferrule in a state that said distal end of said ferrule projects forwardly from a distal-end side wall portion of said accommodating recess;
a connector cover fitted to said connector body so as to close the opening in said accommodating recess; and
a boot provided around said optical fiber, a ferrule-side end portion of said boot being inserted into said connector housing so as to be prevented from coming off and retained,
wherein at least one of said connector body and said connector cover has a retaining portion, and an ferrule-side end portion of said boot has a retained portion engaged with said retaining portion so as to prevent from coming off and retained.

20. An optical connector according to claim 19, wherein said boot is formed of an elastomer.

21. An optical connector according to claim 2, wherein a part of said retained portion is formed of a through hole, and said retaining portion is provided with a penetrating projection which is passed through said through hole.

22. An optical connector according to claim 21, wherein one of said connector body and said connector cover opposing to a projecting end of said penetrating projection has a supporting portion being abutted on said penetrating projection in a direction in which said boot comes off said connector housing when said boot is pulled in said coming-off direction.

23. An optical connector according to claim 20, wherein an end portion of said boot which is opposite to the ferrule-side end portion thereof is formed to be thinner in thickness than the ferrule-side end portion thereof.

24. An optical connector according to claim 19, wherein said retaining portion has at least one of a recess and a projection, and said retained portion has an other-recess and an other projection corresponding to said recess and said projection.

25. A boot for an optical connector, said boot protecting a portion of an optical fiber extending from the optical connector,
said boot having a retained portion being engagable with a retaining portion of said optical connector for preventing said optical fiber coming off said optical connector, said retained portion provided on a connecting end portion which connects with said optical connector, wherein said boot is formed of an elastomer and an end portion of said boot which is opposite to said connecting end portion is formed to be thinner in thickness than said connecting end portion.

26. A boot for an optical connector according to claim 25, wherein said retained portion is formed of a recess corresponding to a projection provided on said retaining portion.

27. A boot for an optical connector according to claim 25, wherein said retained portion is formed of a through hole penetrated by a penetrating projection provided on said retaining portion.

* * * * *